(12) United States Patent
Kelderman

(10) Patent No.: US 8,734,077 B2
(45) Date of Patent: *May 27, 2014

(54) BALE PICKING TRUCK

(71) Applicant: Gary L. Kelderman, Oskaloosa, IA (US)

(72) Inventor: Gary L. Kelderman, Oskaloosa, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,841

(22) Filed: Feb. 11, 2013

(65) Prior Publication Data

US 2013/0149097 A1 Jun. 13, 2013

Related U.S. Application Data

(63) Continuation of application No. 12/824,540, filed on Jun. 28, 2010, now Pat. No. 8,408,857.

(51) Int. Cl.
*A01D 90/08* (2006.01)

(52) U.S. Cl.
USPC ........................................................ 414/111

(58) Field of Classification Search
USPC ........ 198/318; 414/111, 24.5, 24.6, 437, 505, 414/523, 527, 789.3, 789.8, 794.4, 794.8, 414/794.9, 795.2, 795.3, 795.9, 7, 97, 414/797.6, 917, 933, 528, 789.2, 789.7, 414/795; 100/18
See application file for complete search history.

(56) References Cited

U.S. PATENT DOCUMENTS

| 2,792,950 | A | * | 5/1957 | Fenton et al. | 414/795.3 |
| 3,278,050 | A | * | 10/1966 | Tarbox | 414/789.7 |
| 3,341,039 | A | | 9/1967 | Cranage | |
| 3,490,613 | A | | 1/1970 | Bellan | |
| 3,510,013 | A | * | 5/1970 | Best | 414/788.8 |
| 3,631,992 | A | * | 1/1972 | Dickinson | 414/795.9 |
| 3,679,081 | A | | 7/1972 | Duncan | |
| 3,826,389 | A | | 7/1974 | Godfrey | |
| 3,934,734 | A | | 1/1976 | Grey | |
| 3,938,432 | A | * | 2/1976 | Jones | 100/7 |
| 4,094,118 | A | * | 6/1978 | Lingl, Sr. | 52/747.12 |
| 4,273,488 | A | | 6/1981 | Hill | |
| 4,368,000 | A | * | 1/1983 | Naaktgeboren et al. | 414/111 |
| 8,408,857 | B2 | * | 4/2013 | Kelderman | 414/111 |
| 2011/0318150 | A1 | * | 12/2011 | Kelderman | 414/518 |

FOREIGN PATENT DOCUMENTS

| EP | 1222850 A1 * | 7/2002 | A01D 85/00 |
| WO | WO 9622010 A1 * | 7/1996 | A01D 90/08 |

* cited by examiner

*Primary Examiner* — Gregory Adams
(74) *Attorney, Agent, or Firm* — Sturm & Fix LLP

(57) ABSTRACT

Biomass may become an important source of combustible fuel in the future. For biomass, such as switchgrass, to be economically viable as a fuel, the processes required to take the plant material from a green, growing plant in the field to an energy dense package must be efficient. A self-propelled bale picking truck simplifies and speeds bale collecting, stacking, and staging for loading onto a truck for transport over the road.

16 Claims, 25 Drawing Sheets

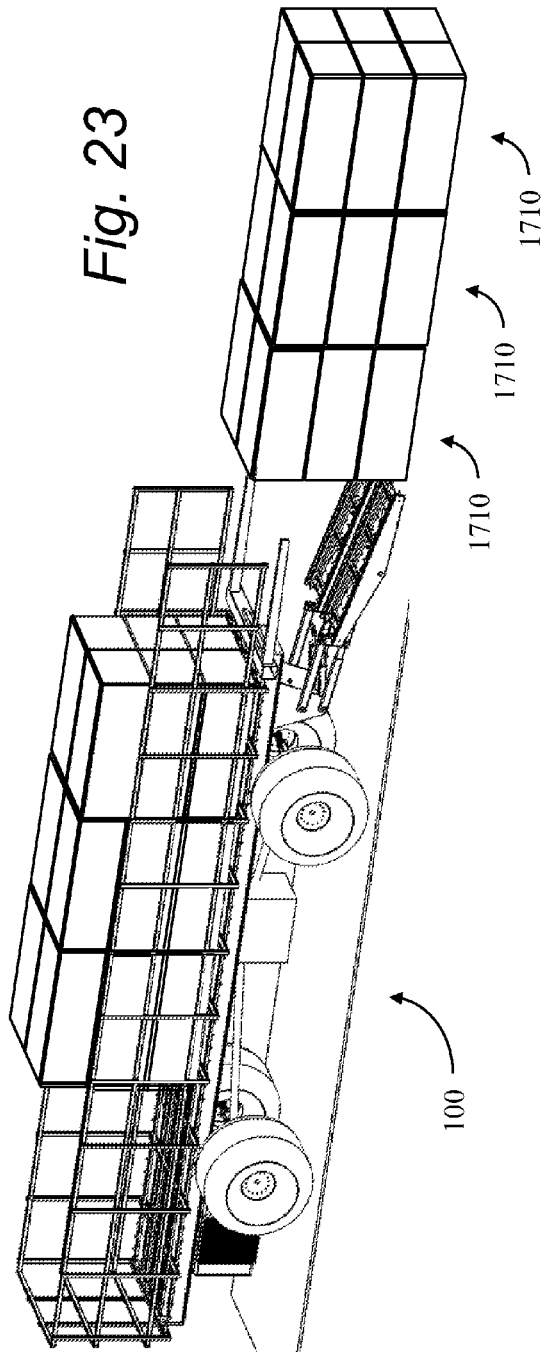
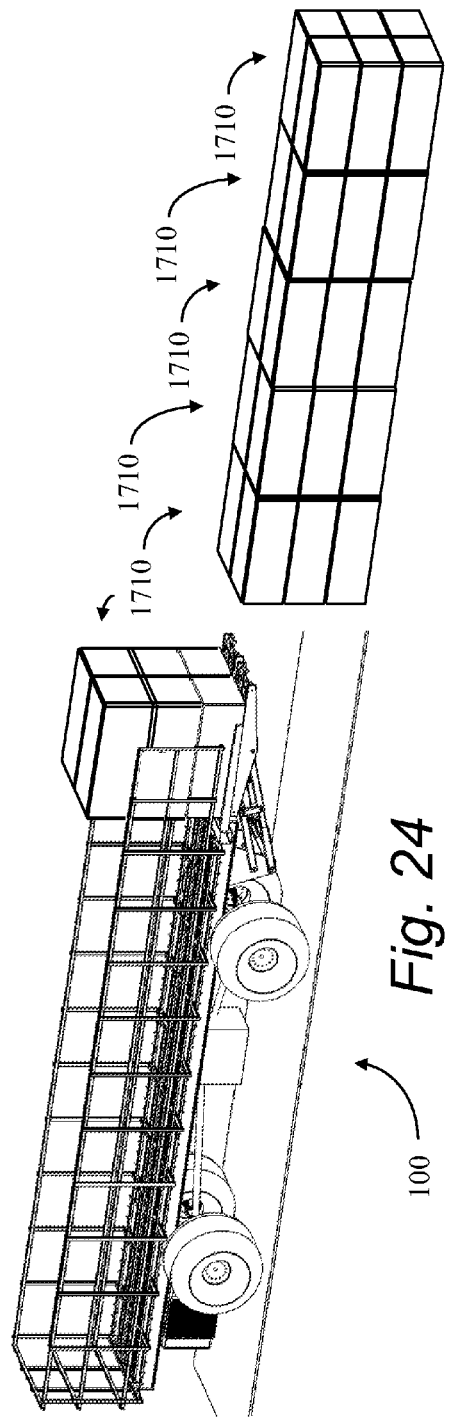

BALE PICKING TRUCK

CROSS REFERENCE TO RELATED APPLICATIONS

This application is a Continuation of U.S. Ser. No. 12/824,540 filed Jun. 28, 2010 entitled Bale Picking Truck, and is hereby incorporated by reference herein in its entirety.

BACKGROUND OF THE INVENTION

1. Field of the Invention

The present invention relates generally to farm and field equipment. More particularly the present invention relates to a method and apparatus for efficiently retrieving large square bales from a field and staging the bales for pickup and transport.

2. Background Art

Biomass as a fuel source is gaining interest and use in the United States and elsewhere. Some biomass products, such as switchgrass, can be baled in the same manner as livestock forage to increase its energy density, reduce its volume, and make its handling more efficient.

One consideration in the utilization of biomass as a source of energy is its net energy available. The raising, harvesting, and transport of biomass products all require energy input. It is counterproductive to expend more energy (especially from fossil fuels) than can be extracted from the biomass.

Bales of forage are often speared with any one of a variety of bale spears available for use with agricultural tractors and even pickup trucks. Bales of biomass, however, are preferably made so dense as to resist spearing. Additionally, spearing is likely to break the twine binding the bale together.

Another method for collecting bales from a field is the use of a frame, usually mounted on a loader on an agricultural tractor. Pivotally attached to the frame is a plurality of claws. The frame is set on a layer of bales, usually small square bales, and the claws rotated into the bales, hence capturing the layer of bales to the frame. The frame and bales may then be lifted and transported using the loader, and deposited in an orderly fashion on a hay rack, in a barn, or on a truck or trailer.

This latter method has been limited to small square bales, and a small number of bales at each pickup.

There is, therefore, a need for a method and apparatus for quickly and efficiently picking up and removing biomass bales from a field in which the biomass was baled. There is a further need for a system for compactly stacking the bales after picking the bales off the ground. Another need is for a method and apparatus for efficiently depositing the bales on the ground at a staging area for later loading onto a semi trailer, straight truck, or train car.

SUMMARY OF THE INVENTION

Bales of biomass are made using common agricultural balers just as livestock forages are baled. Preferably, the resulting bales are rectangular parallelepiped in shape, to be easily and stably stackable. Bale size is preferably that commonly referred to as a "large square bale." These bales typically weigh over 700 pounds and are tied with baling twine. The dimensions of the bales vary based on the desires of those involved in baling, storing, or feeding the bales. Although the present invention is not limited to a particular size bale, ideal dimensions of the bale picking truck will be based on bale size.

Preferably, the bales will be produced by a baler using a hydraulically forced plunger to compact the bales. Bales made in this way may be denser than if the plunger is driven by a crank and linkage. Increasing energy density is a goal in biomass bale formation.

The biomass bales are preferably dropped from the baler to the ground in pairs, the two bales being in close proximity to one another. The bale picking truck is preferably self-propelled through the field with four wheel drive and four wheel steering. An operator operates the bale picking truck from a cab near the front of the bale picking truck.

A pickup assembly at the front of the bale picking truck may be lowered to ground level when approaching the bale pair and both bales preferably drawn onto the pickup assembly nearly simultaneously. The gathering chains on the pickup assembly are actuated with independent hydraulic motors, so bales need not be handled simultaneously. Bales will be stacked on the bale picking truck. A first pair of bales composing a stack of bales will eventually reside on a top tier of the stack. This first pair of bales is held stationary near the front of the hay storage area of the bale picking truck, just below conveyor chains used for transferring the bales toward the back of the bale picking truck.

A second pair of bales are picked up using the pickup assembly, and raised under the first pair, so the first pair becomes the top tier and the second pair becomes, at least temporarily, the bottom tier. This process is repeated a predetermined number of times until a stack is completed. The stack is then disposed on top of the conveyor chains and transferred rearward an adequate distance to provide room for a new stack. A predetermined number of stacks are made in this fashion to compose a load of bales in the bale picking truck. Each stack is shifted back by the length of a stack before building a new stack. The load in the bale picking truck may be determined by the load transportable by a semi tractor and trailer on the road.

When a load of bales has been loaded onto the bale picking truck, the bale picking truck is driven to a staging area for unloading. The front-most stack is lowered using the pickup assembly and conveyed off the front of the pickup assembly to the ground. The bale picking truck is backed in a rearward direction the length of a stack to leave room for another stack between the front of the pickup assembly and the stack already on the ground. The remaining stacks are moved forward in the bale picking truck, and the front-most stack is lowered and placed on the ground as before. This process is repeated until the load has been unloaded to the ground with all the stacks still assembled. At the staging area, the load is preferably loaded on a semi trailer for transport from the staging area to the bales' destination.

For the purposes of this document, including the claims a bale is defined as a compacted mass of material in a roughly rectangular parallelepiped shape. A load of bales is defined as the set of bales needed to essentially completely fill the bale picking truck. A stack of bales is defined as a plurality of bales assembled at the front of the bale picking truck before transferring them toward the back of the bale picking truck. A load, then, comprises a plurality of stacks. Note that the last stack assembled in a load may not be moved back in the bale picking truck. A forward direction is defined as the normal operating direction the bale picking truck is operated when picking up bales. A reverse direction is defined as opposite the forward direction. The front of the bale picking truck is defined as the leading area when the bale picking truck is operated in the forward direction. The bale pickup assembly is disposed on the front of the bale picking truck. The rear of the bale picking truck is defined as the opposite end of the bale picking truck from the front.

A purpose of this invention is to provide a method and apparatus for efficiently picking up bales of biomass in the field for transport to a staging area. Another object is to provide a system for compactly stacking the bales picked up in the field. Still another object is to provide a method and apparatus for depositing the bales on the ground or staging surface while maintaining their stacked arrangement.

The novel features which are believed to be characteristic of this invention, both as to its organization and method operation together with further objectives and advantages thereto, will be better understood from the following description considered in connection with accompanying drawings in which a presently preferred embodiment of the invention is illustrated by way of example. It is to be expressly understood however, that the drawings are for the purpose of illustration and description only and not intended as a definition of the limits of the invention.

BRIEF DESCRIPTION OF THE DRAWINGS

FIG. 23 is a third view in the sequence of views illustrating unloading stacks from the bale picking truck;

FIG. 24 is a fourth view in the sequence of views illustrating unloading stacks from the bale picking truck;

BEST MODE FOR CARRYING OUT THE INVENTION

Figure 1:
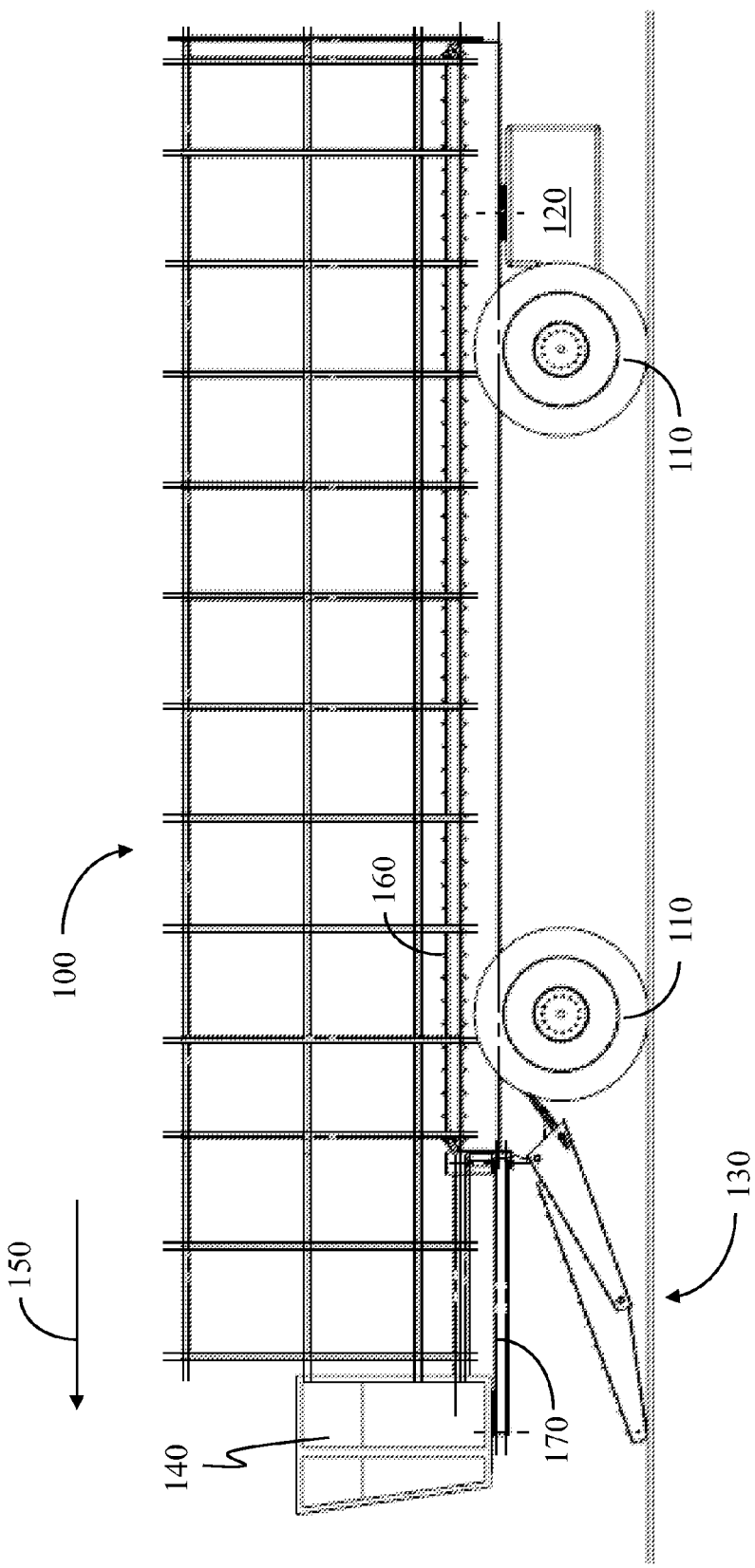
FIG. 1 is a side elevation view of a bale picking truck of the present invention.
Figure 2:
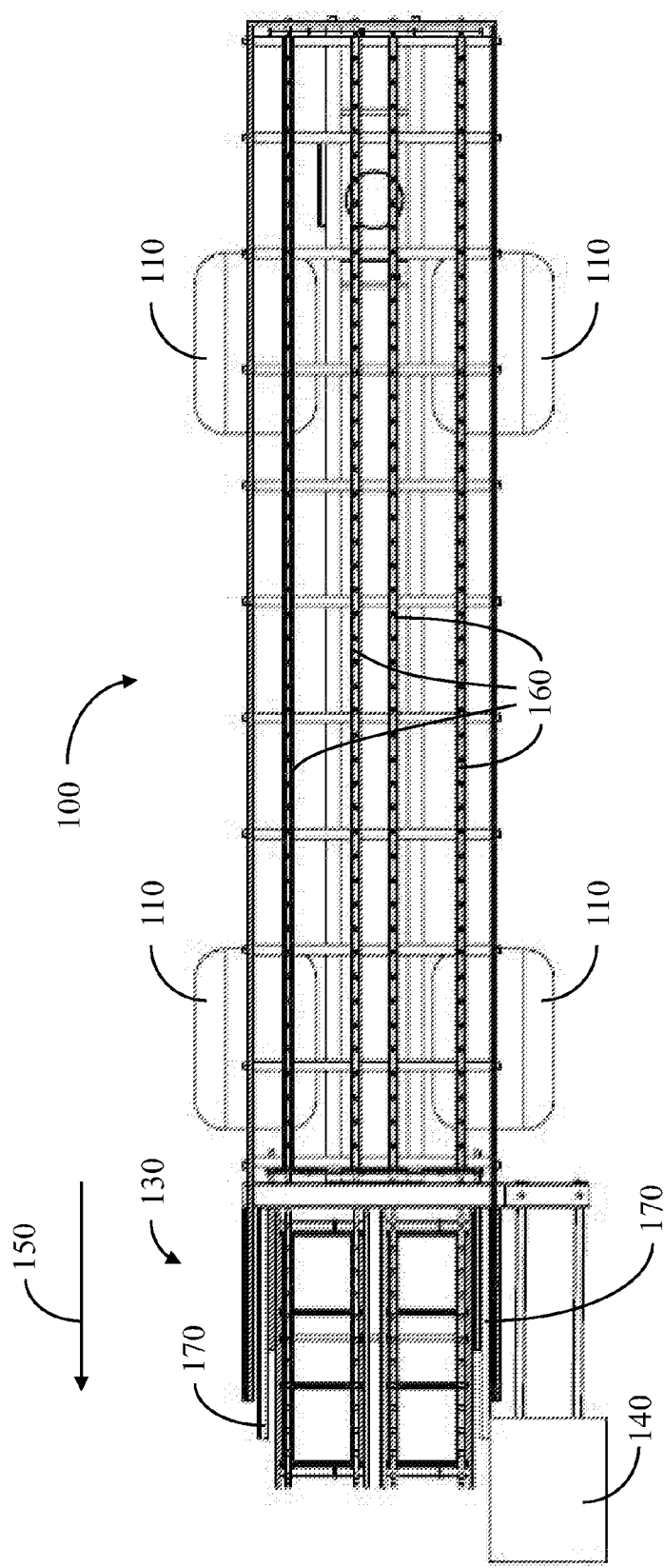
FIG. 2 is a top plan view of the bale picking truck.
Figure 3:
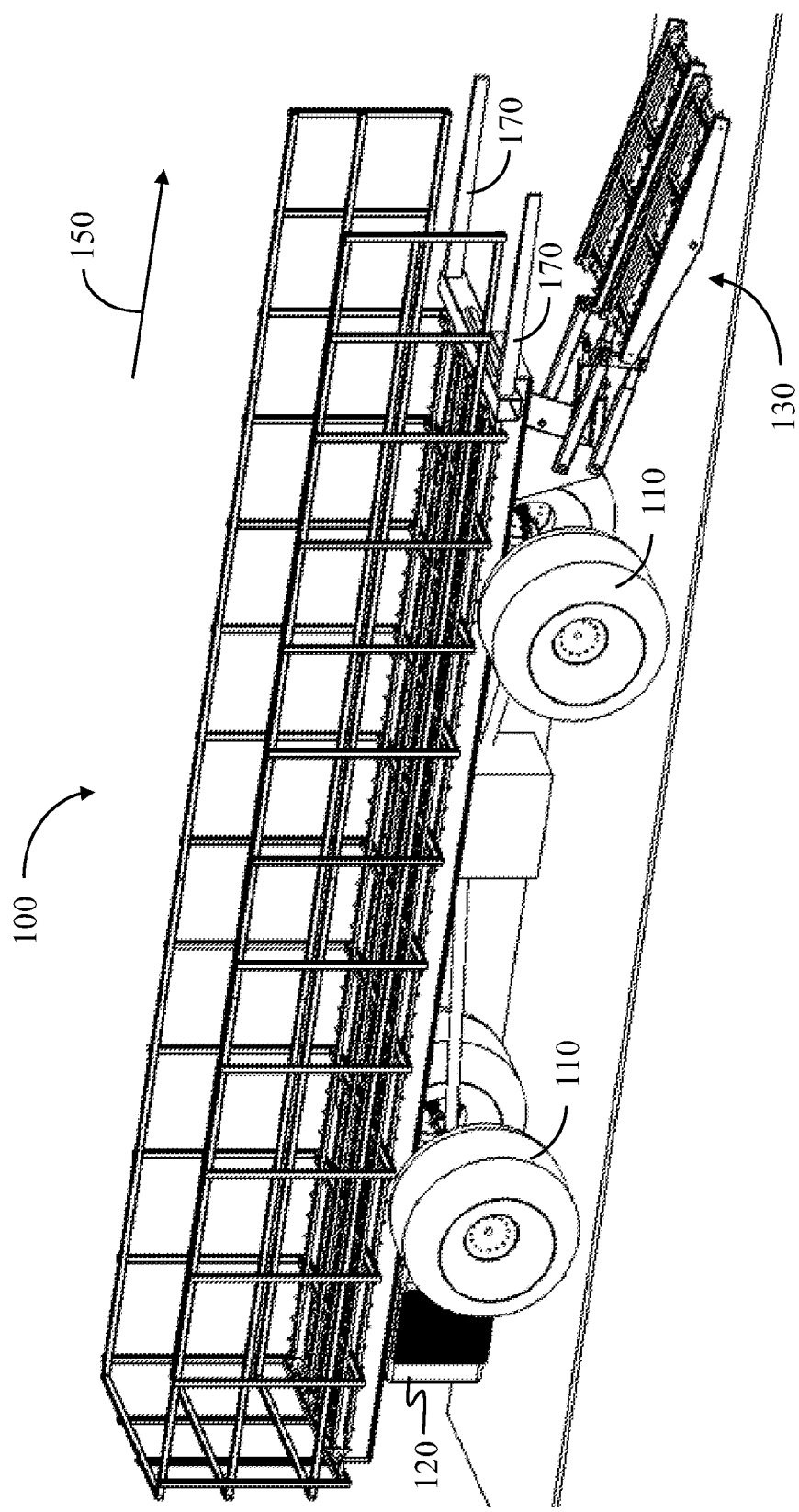
FIG. 3 is a perspective view of the bale picking truck with the pickup assembly lowered to the ground.
Figure 4:
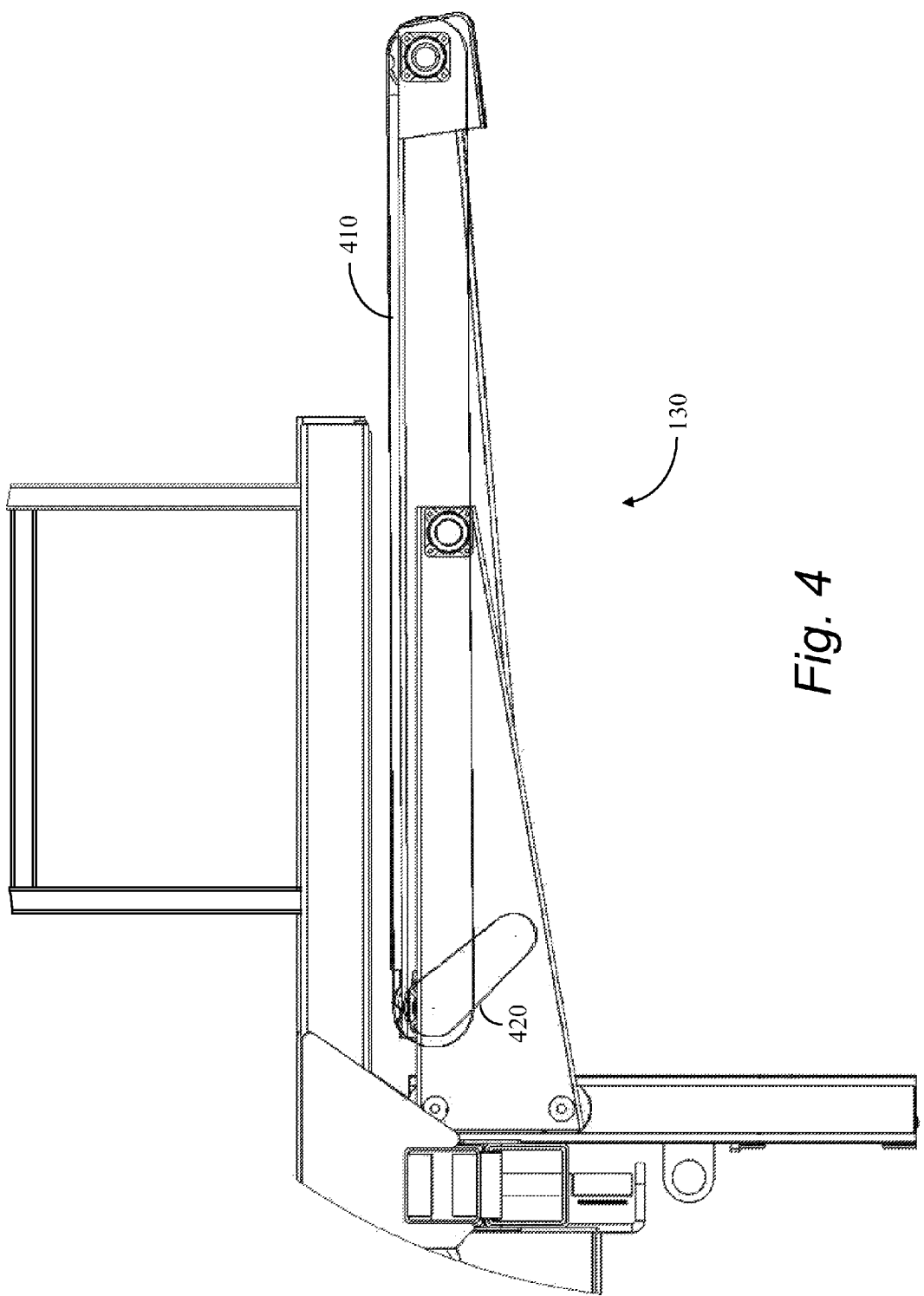
FIG. 4 is a side elevation view of a pickup assembly of the bale picking truck.
Figure 5:
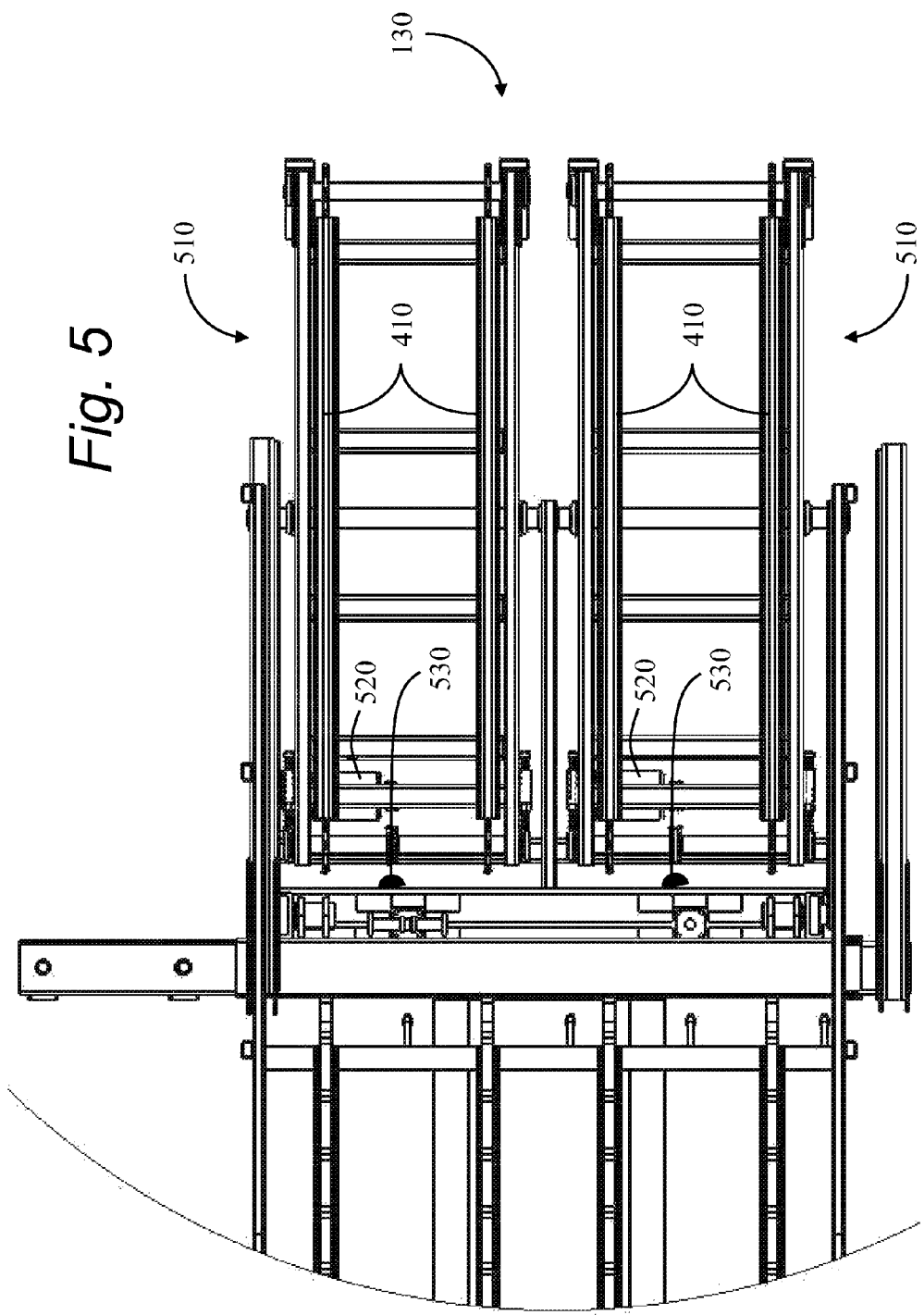
FIG. 5 is a top elevation view of the pickup assembly.
Figure 6:
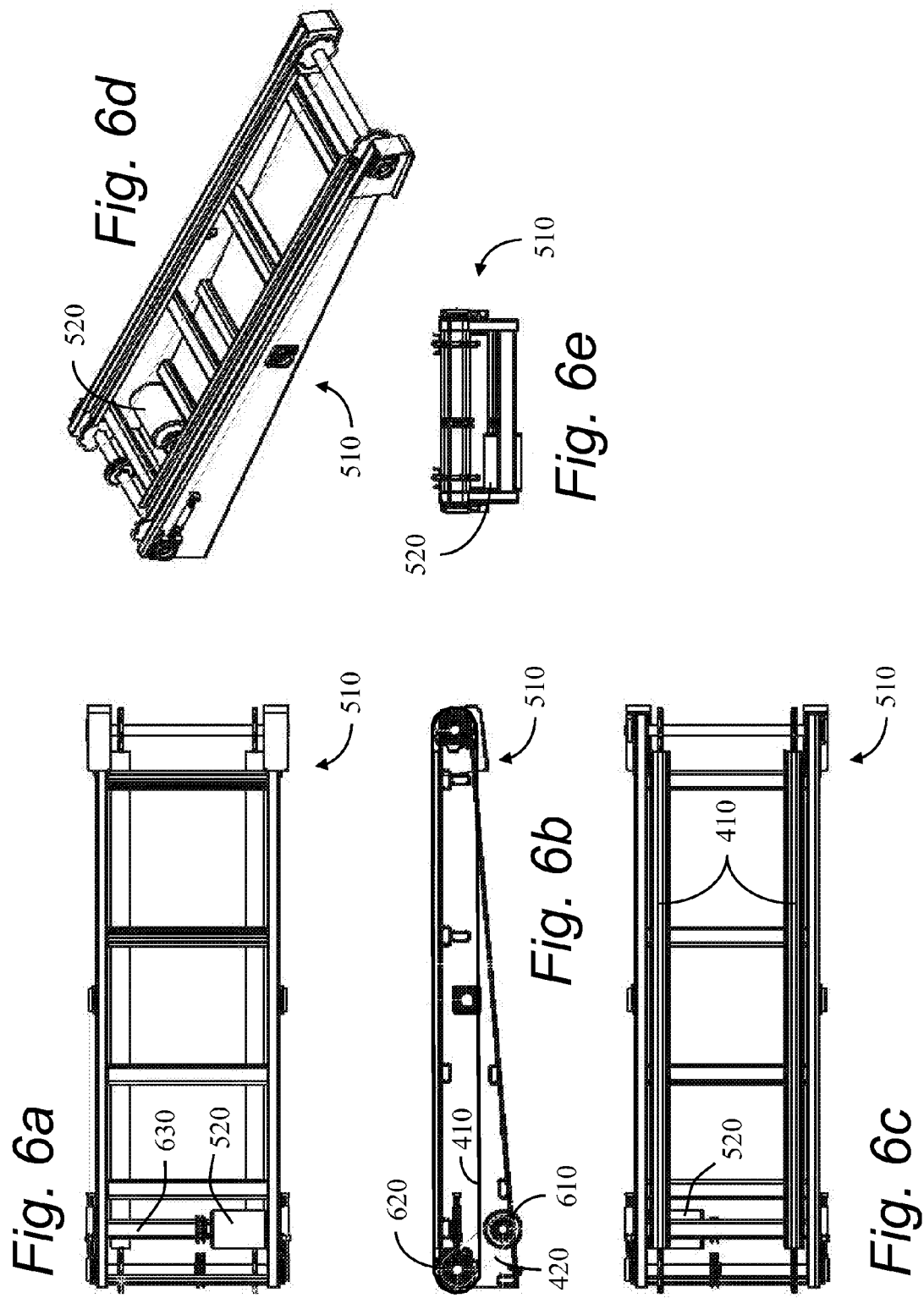
FIG. 6a is plan view from below of one leveling table of the pickup assembly.
FIG. 6b is a side elevation view of the leveling table.
FIG. 6c is a top elevation view of the leveling table.
FIG. 6d is a perspective view of the leveling table.
FIG. 6e is a front elevation view of the leveling table.
Figure 7:
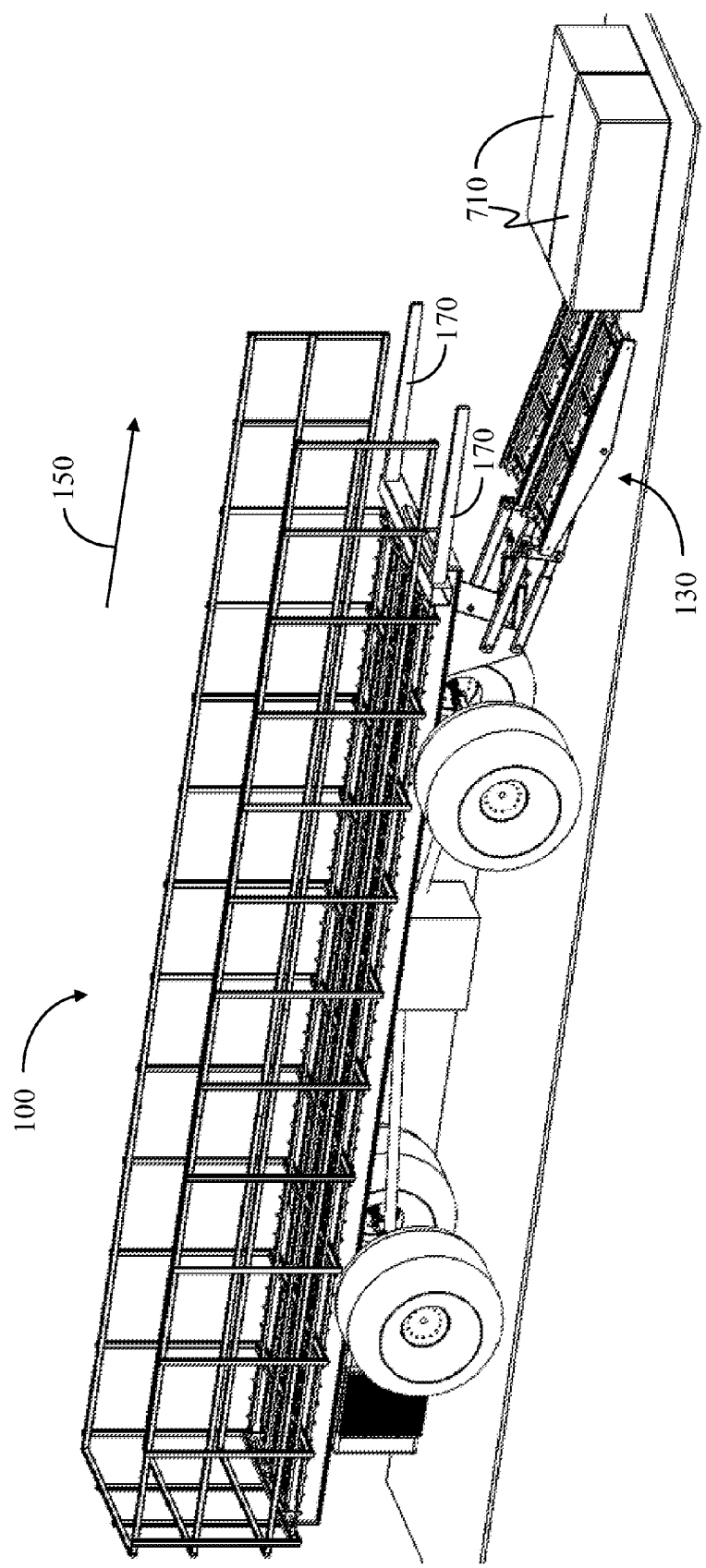
FIG. 7 is a first view in a sequence of views illustrating how stacks are made to compose a load.
Figure 8:
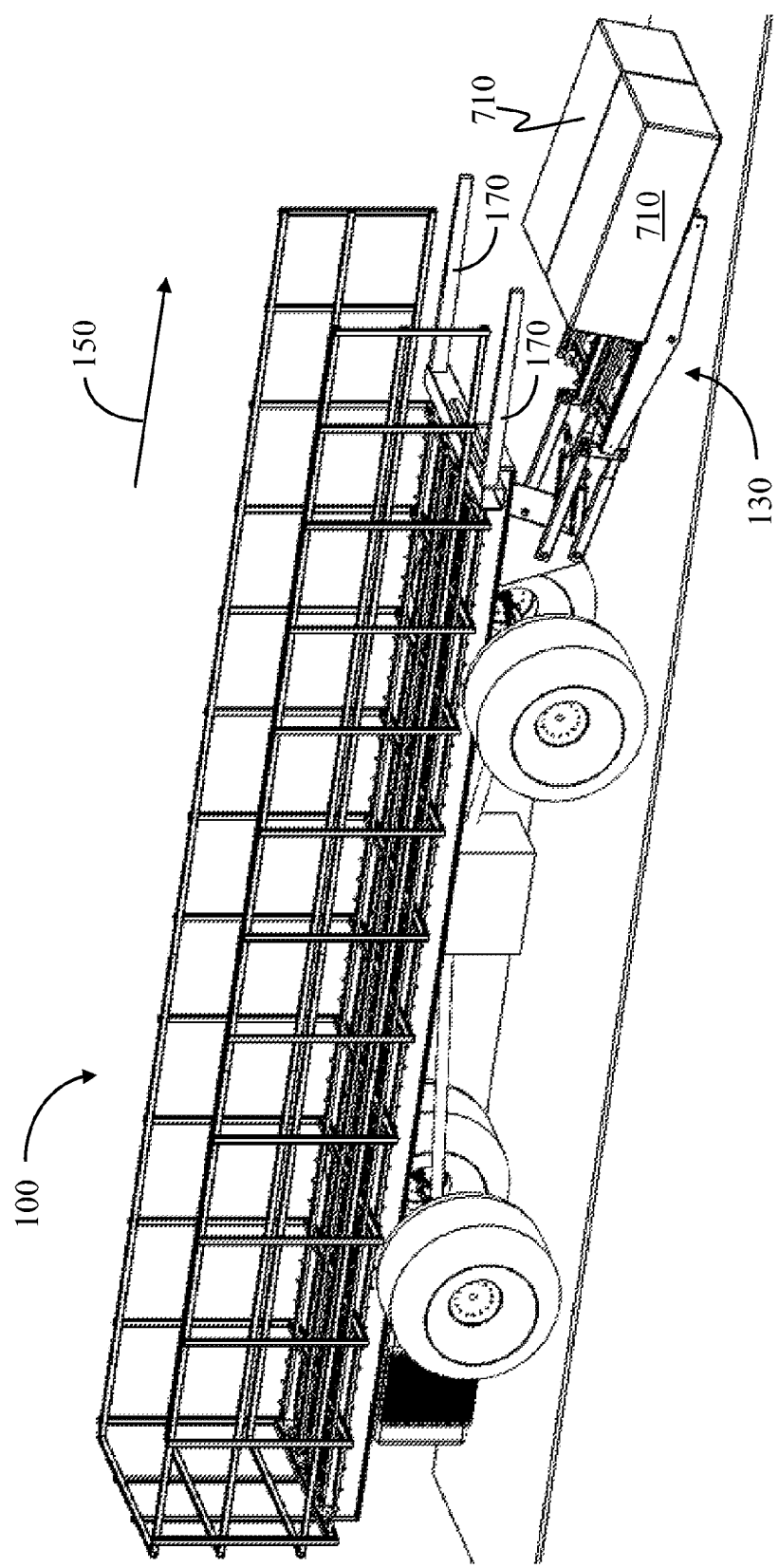
FIG. 8 is a second view in the sequence of views illustrating how stacks are made to compose a load.
Figure 9:
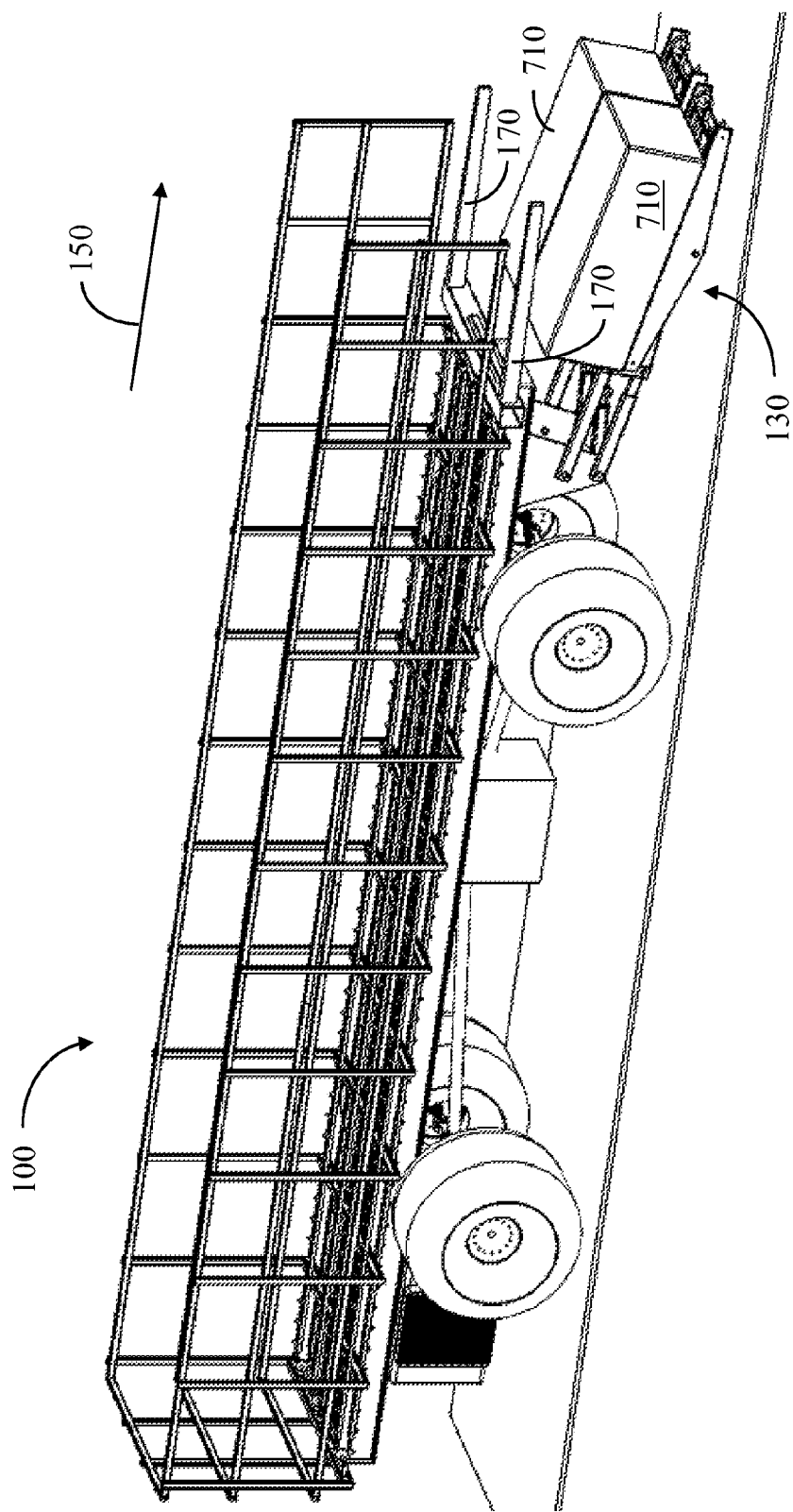
FIG. 9 is a third view in the sequence of views illustrating how stacks are made to compose a load.
Figure 10:
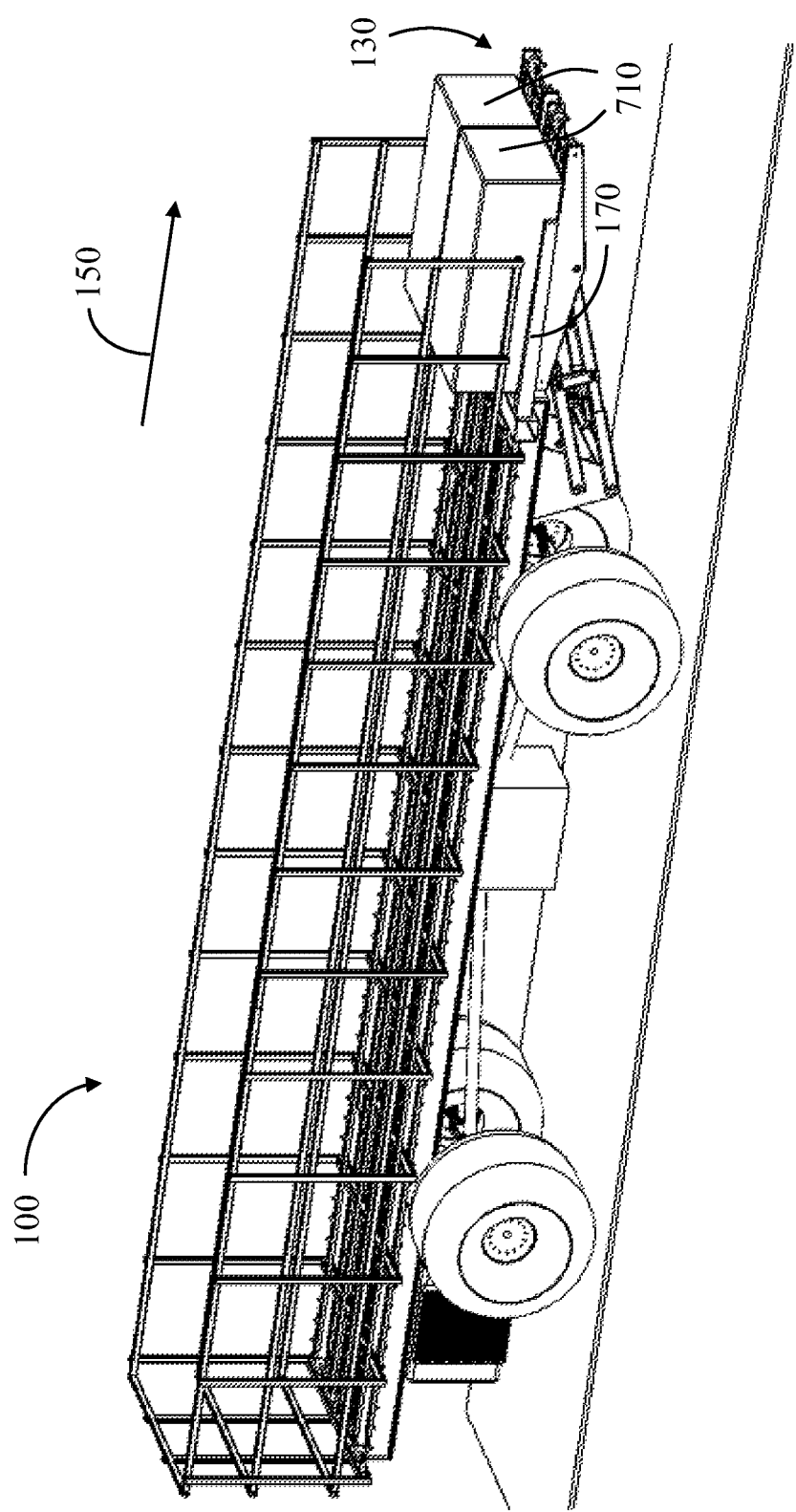
FIG. 10 is a fourth view in the sequence of views illustrating how stacks are made to compose a load.
Figure 11:
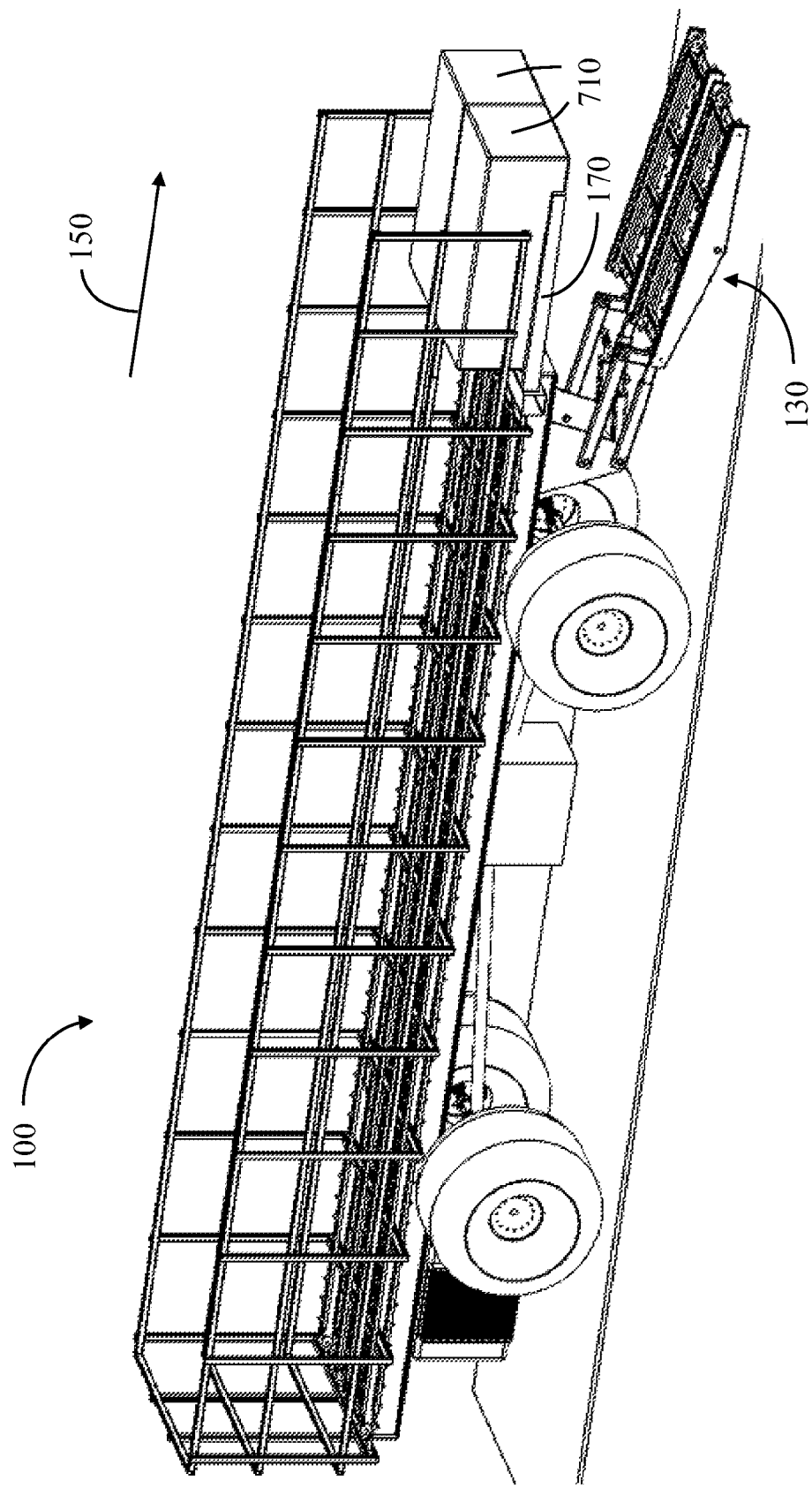
FIG. 11 is a fifth view in the sequence of views illustrating how stacks are made to compose a load.

Referring now to the drawings wherein like reference numerals indicate identical or corresponding parts throughout the several views, the present invention in its preferred embodiment comprises a self-propelled bale picking truck 100, shown in FIGS. 1-26. As seen in FIGS. 1-3, the bale picking truck 100 preferably has four wheel drive and four-wheel steering to better deal with uneven, wet, or otherwise undesirable terrain, possibly in tight operating conditions.

The ground engaging wheels 110 are preferably large and wide to provide floatation and reduce compaction of the soil.

The engine 120, providing power to the wheels 110 and hydraulics, is shown in the rear of the bale picking truck 100.

An operator resides in a cab 140 near the front of the bale picking truck 100 where the loading of the bales 710 (see FIG. 7) can best be viewed. As previously defined, the forward direction is shown by the arrow 150. The cab 140 has been omitted in FIGS. 3 and 7-26 for clarity.

Figure 27:
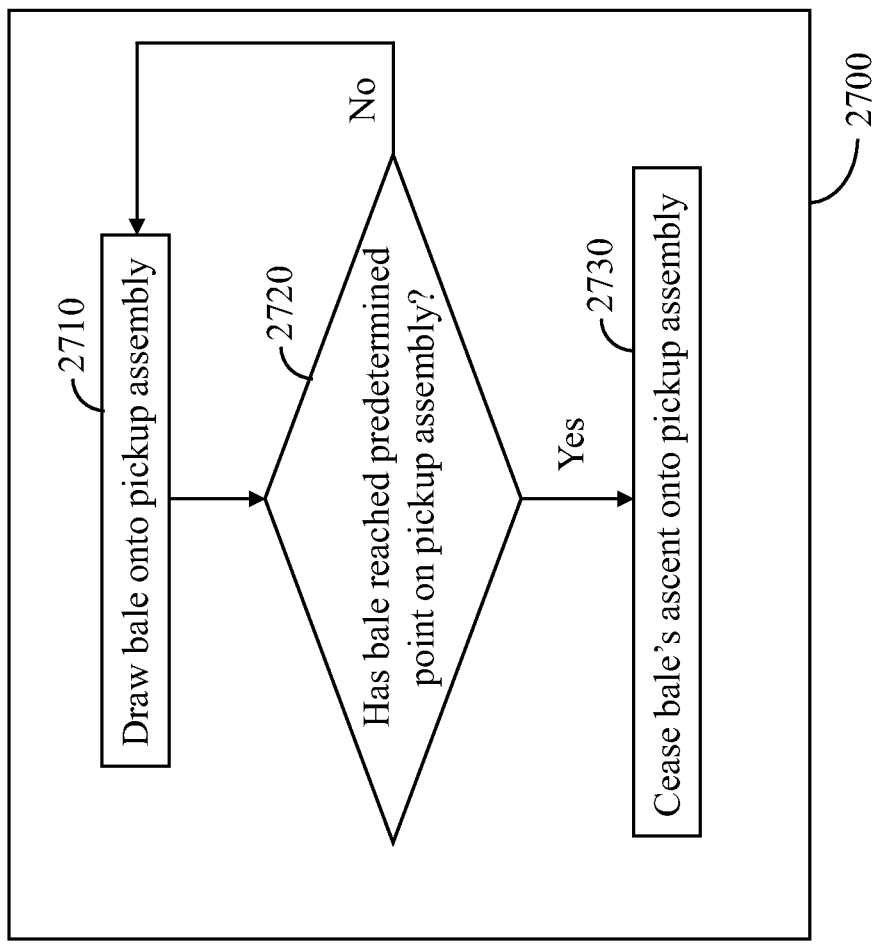
FIG. 27 is a flow diagram depicting logic used in a control system.

A pickup assembly 130 is shown near the front of the bale picking truck 100. As is seen in the sequence of views in FIGS. 4-6e, the preferred pickup assembly 130 includes gathering chains 410, hydraulically and independently driven for moving the bales 710 off the ground onto the pickup assembly 130, and then from the pickup assembly onto the frame of the bale picking truck 100. Additionally, the pickup assembly 130 is articulatable to raise the bales 710 up to a level of conveyor chains 160 in the frame of the bale picking truck 100. Sensors 530 at the top if the pickup assembly 130 sense when each respective bale 710 has reached the top of the pickup assembly 130. When a bale 710 is drawn 2710 onto the pickup assembly 130, a control system 2700, for which the logic is depicted in FIG. 27, receives each sensor's 530 signal and detects 2720 when the bale 710 has reached a predetermined point on the pickup assembly 130. The control system 2700 then stops 2730 the associated bale's 710 ascension up the pickup assembly 130.

The gathering chains 410 for each separate leveling table 510 are preferably hydraulically driven by hydraulic motors 520. Because each leveling table's 510 gathering chains 410 are driven by a dedicated hydraulic motor 520, each bale 710 may be individually moved into place. In this way, a bale 710 that lags behind its partner bale 710 may be brought adjacent to the partner bale 710 for neatness and to build a stable stack 1710 of bales.

A first gear 610 is attached to a shaft of each hydraulic motor 520. A drive chain 420 is driven by the first gear 610. The drive chain, in turn, drives a second gear 620, connected to a shaft 630. The gathering chains 410 are driven by the shaft 630.

Gripping bars 170, disposed above the pickup assembly 130, press inward, reducing any gap existing between the two bales 710 and holding the bales 710 firmly so the pickup assembly 130 may be returned to ground level to retrieve more bales 710. This can best be seen in FIG. 11.

Figure 12:
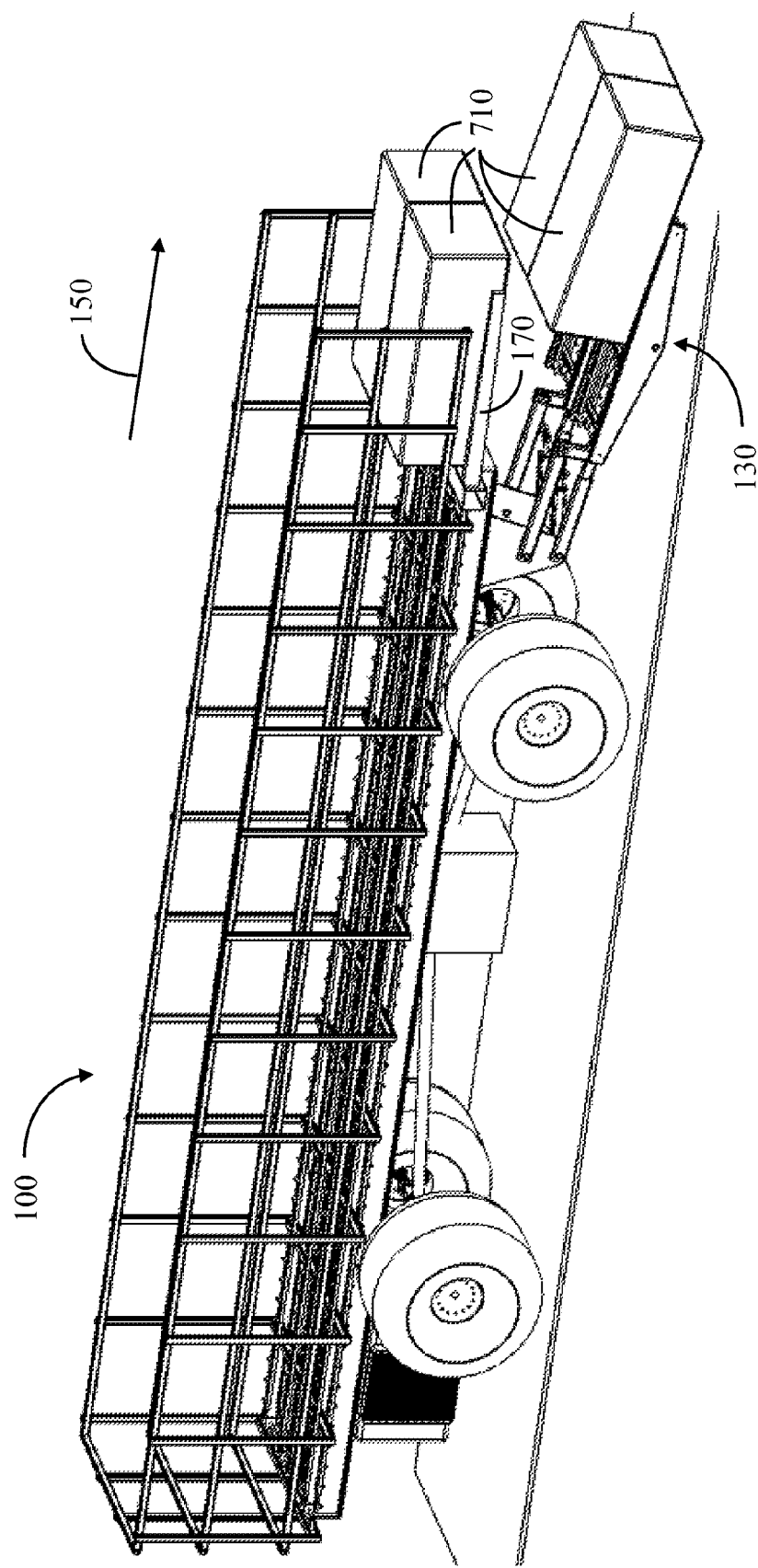
FIG. 12 is a sixth view in the sequence of views illustrating how stacks are made to compose a load.
Figure 13:
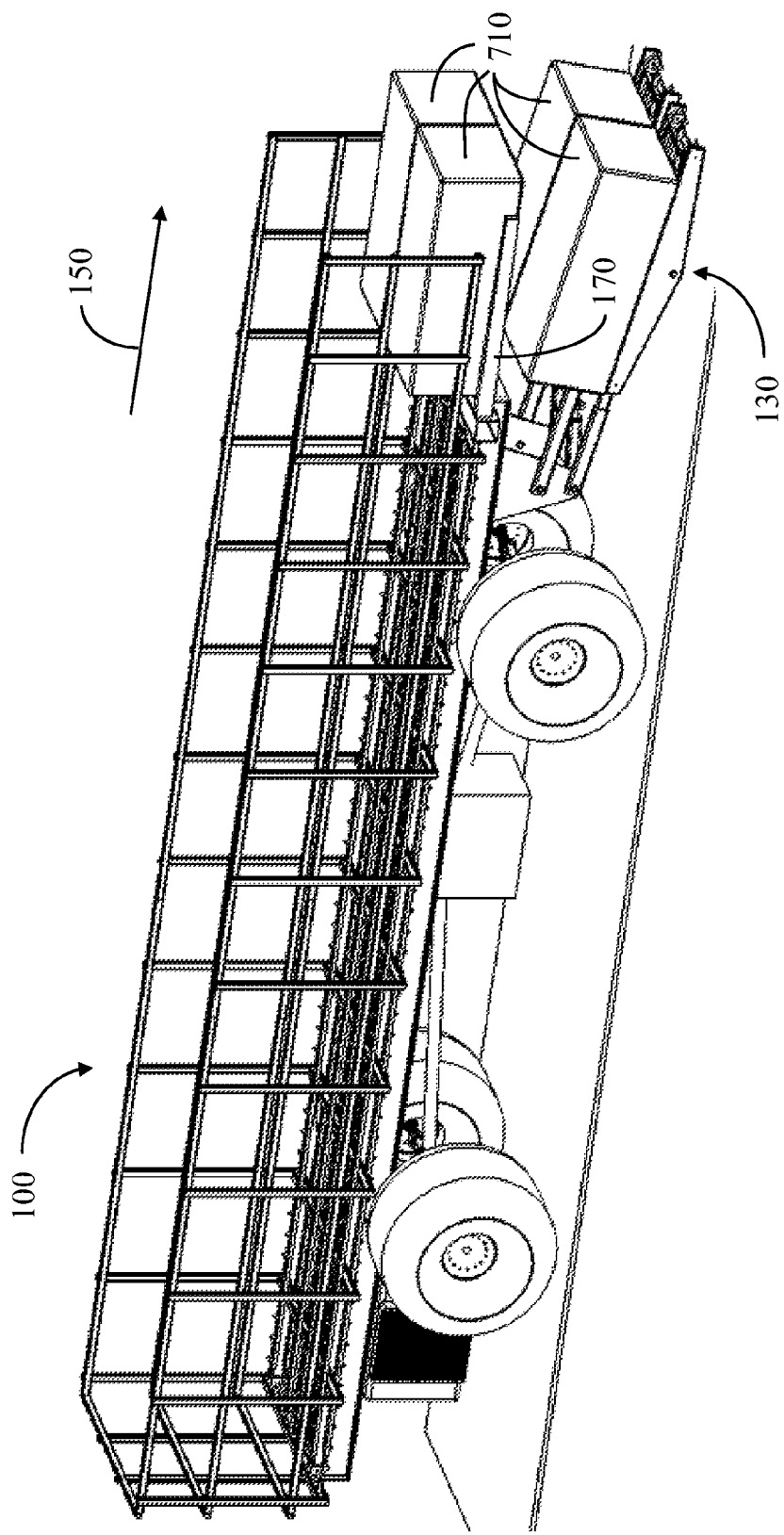
FIG. 13 is a seventh view in the sequence of views illustrating how stacks are made to compose a load.
Figure 14:
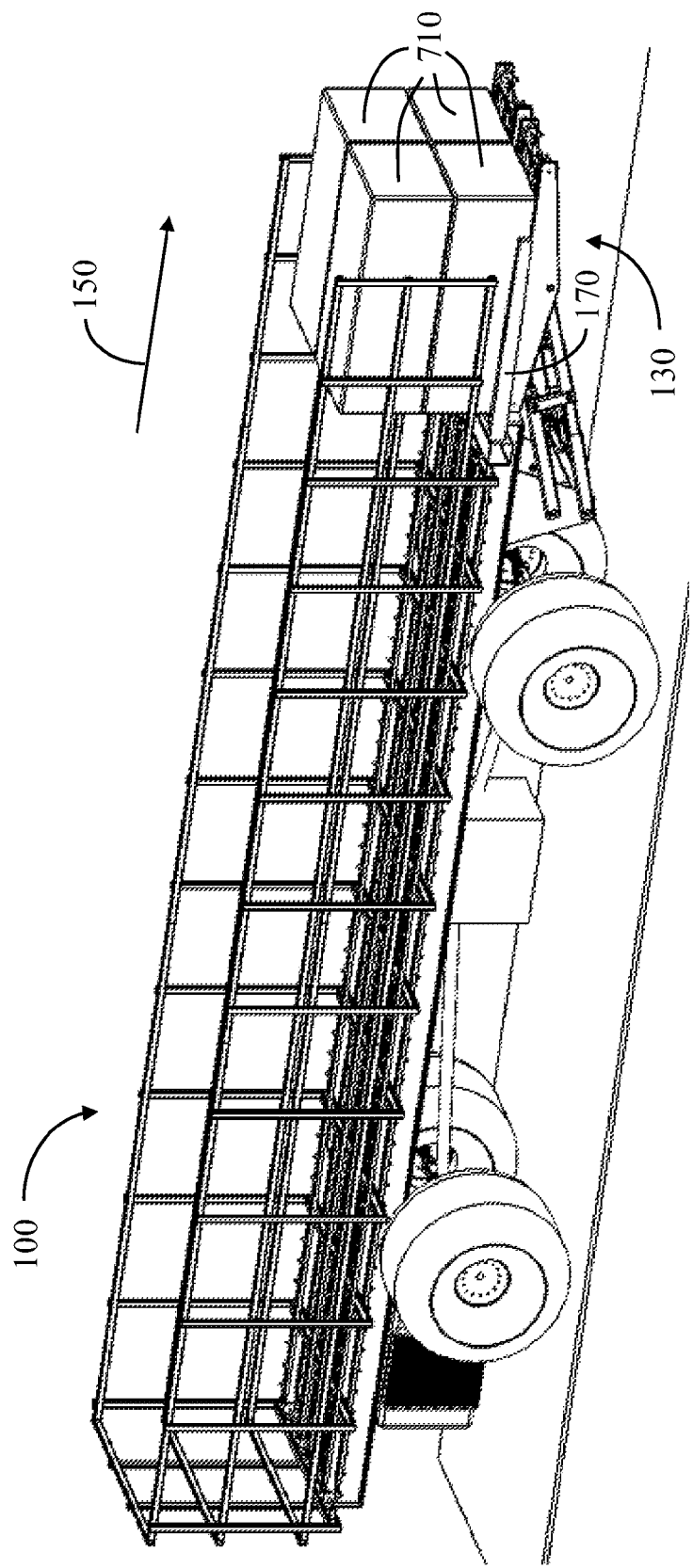
FIG. 14 is a eighth view in the sequence of views illustrating how stacks are made to compose a load.

A second pair of bales 710 is picked up off the ground and gathered onto the pickup assembly 130 as before, with the first pair of bales 710 suspended above the second pair of bales 710 as best seen in FIGS. 12-14. The second pair of bales 710 takes the place of the first pair of bales 710 between the gripping bars 170, with the first pair of bales 710 disposed on top of the second pair of bales 710 as seen in FIG. 14. All the bales 710, thus far loaded, are held suspended by the gripping bars 170.

Figure 15:
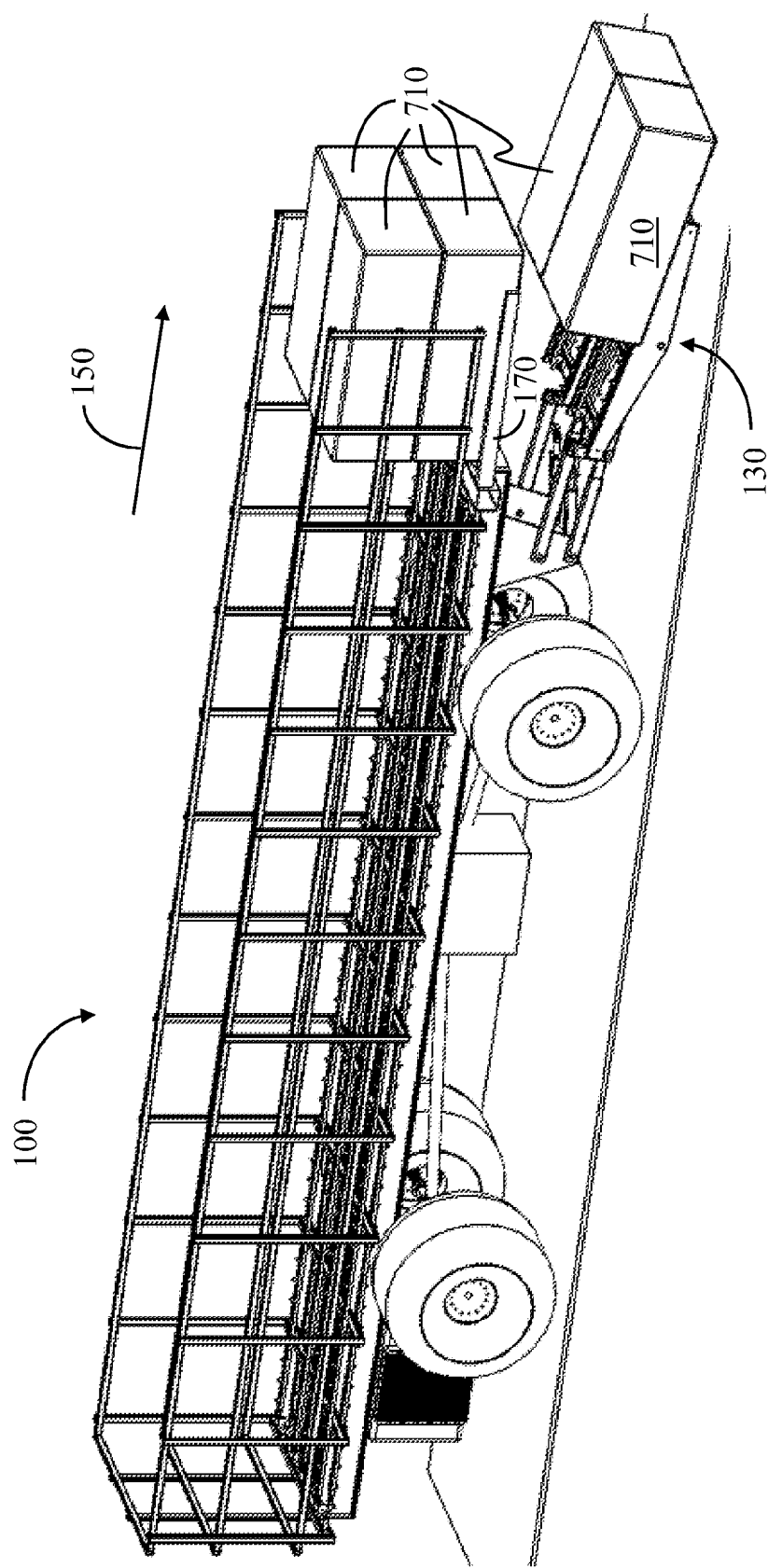
FIG. 15 is a ninth view in the sequence of views illustrating how stacks are made to compose a load.
Figure 16:
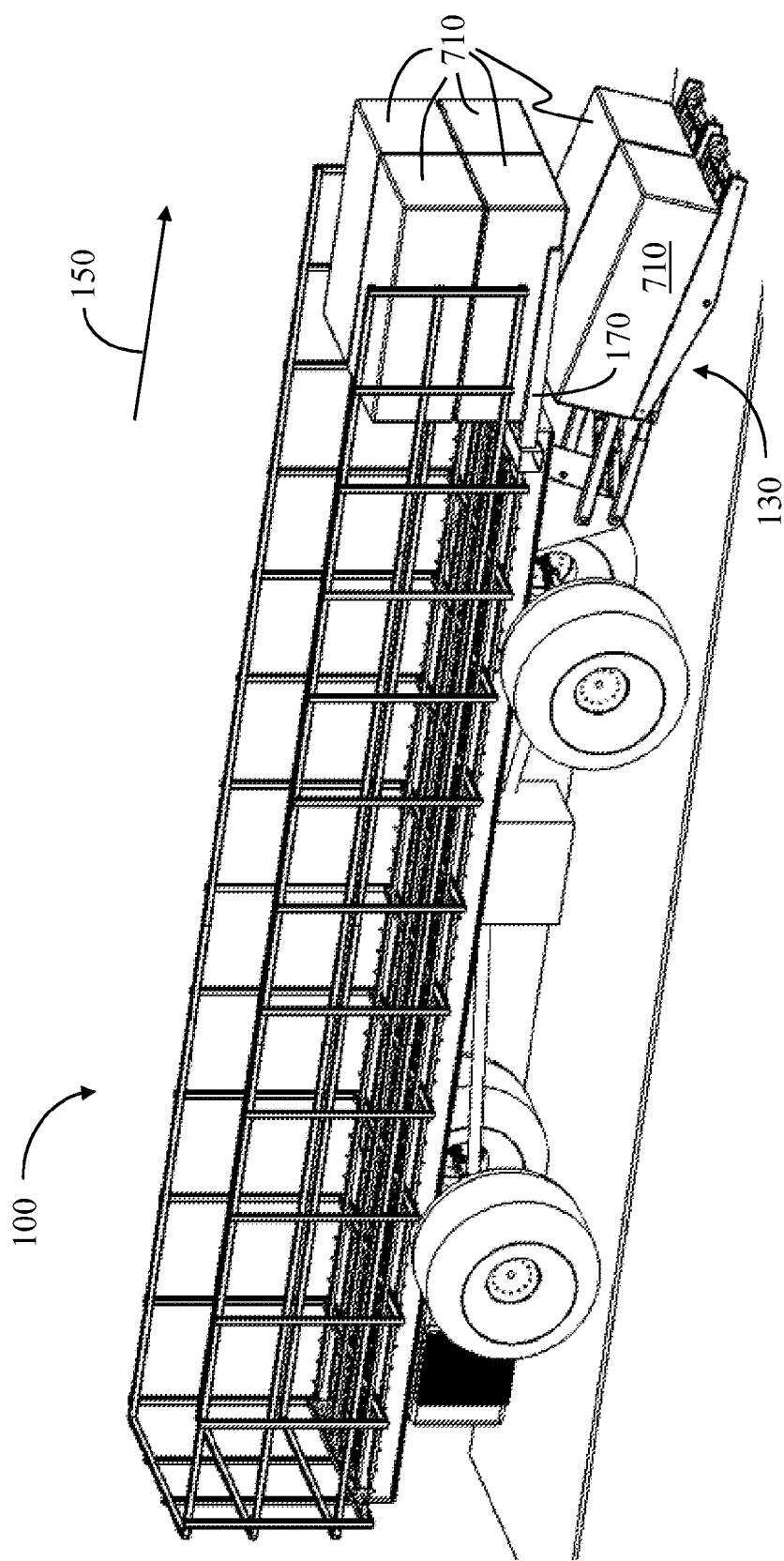
FIG. 16 is a tenth view in the sequence of views illustrating how stacks are made to compose a load.
Figure 17:
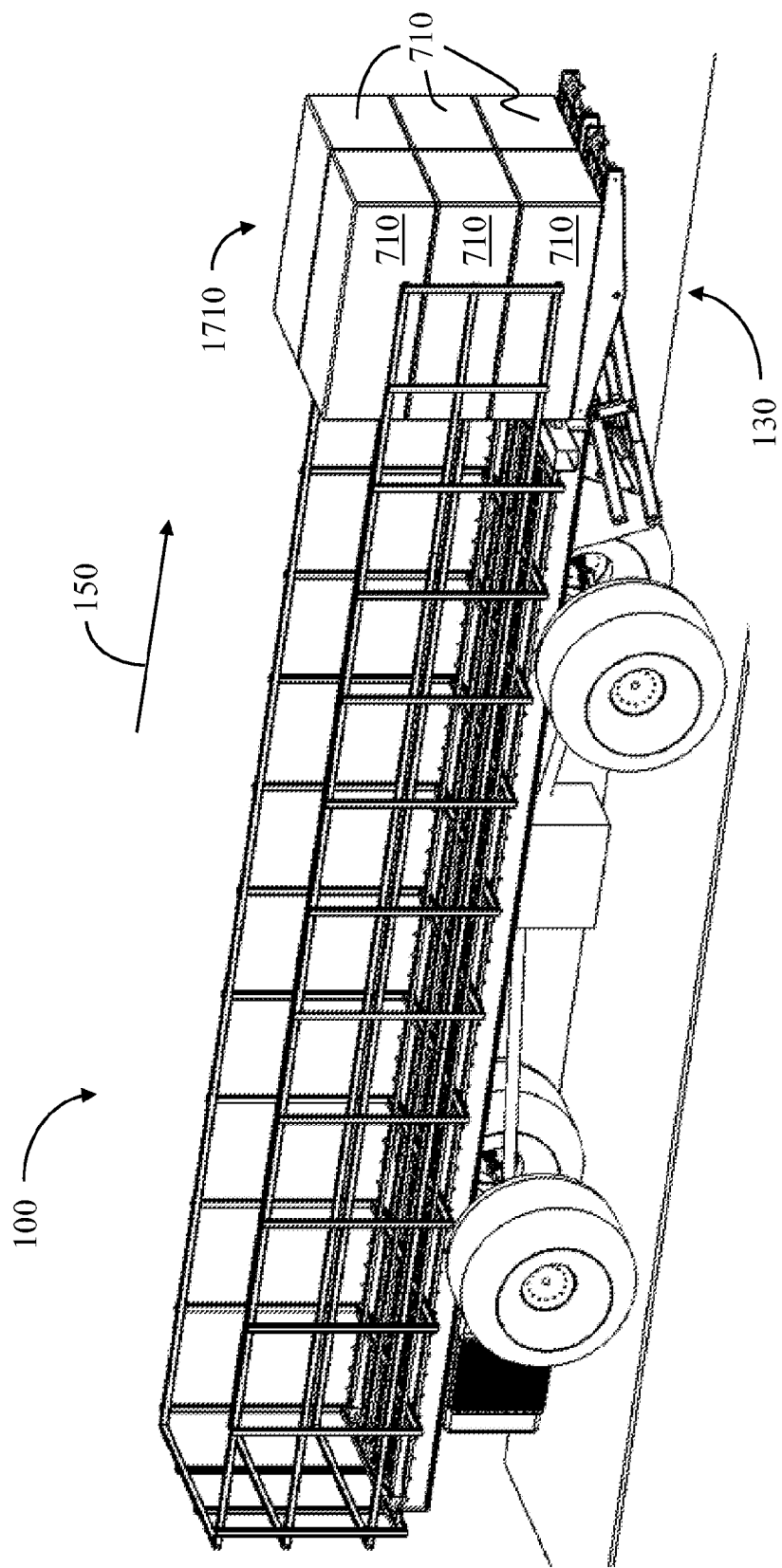
FIG. 17 is a eleventh view in the sequence of views illustrating how stacks are made to compose a load.

The process is repeated with a third set of bales 710 as shown in FIGS. 15-17. In FIG. 17, a stack 1710 has been completed for the preferred embodiment. The number of bales in a stack 1710 may vary depending on preference, bale size, and bale picking truck 100 size, and the present invention is not limited to a particular number of bales 710 in a stack 1710.

Figure 18:
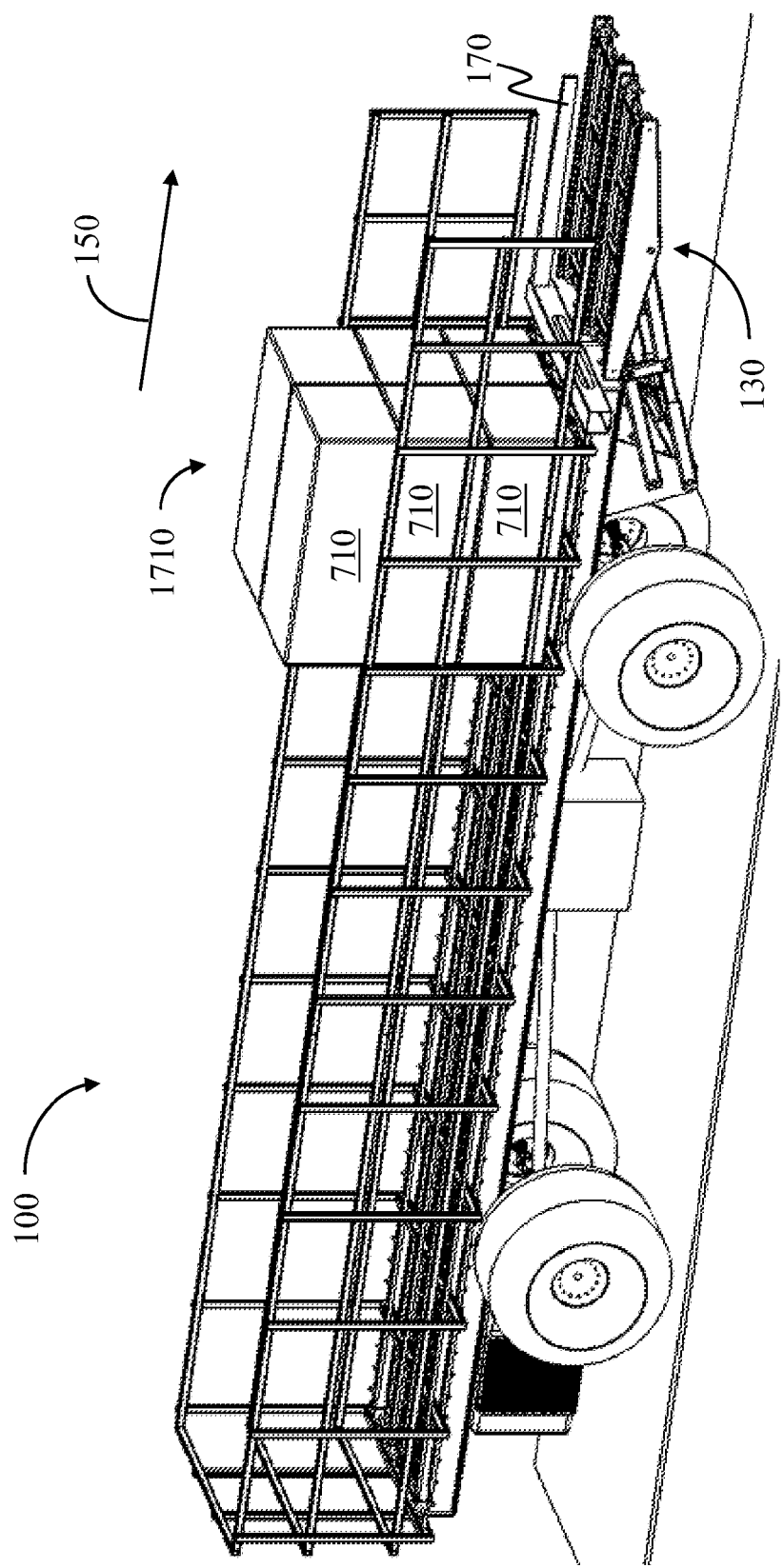
FIG. 18 is a twelfth view in the sequence of views illustrating how stacks are made to compose a load.
Figure 19:
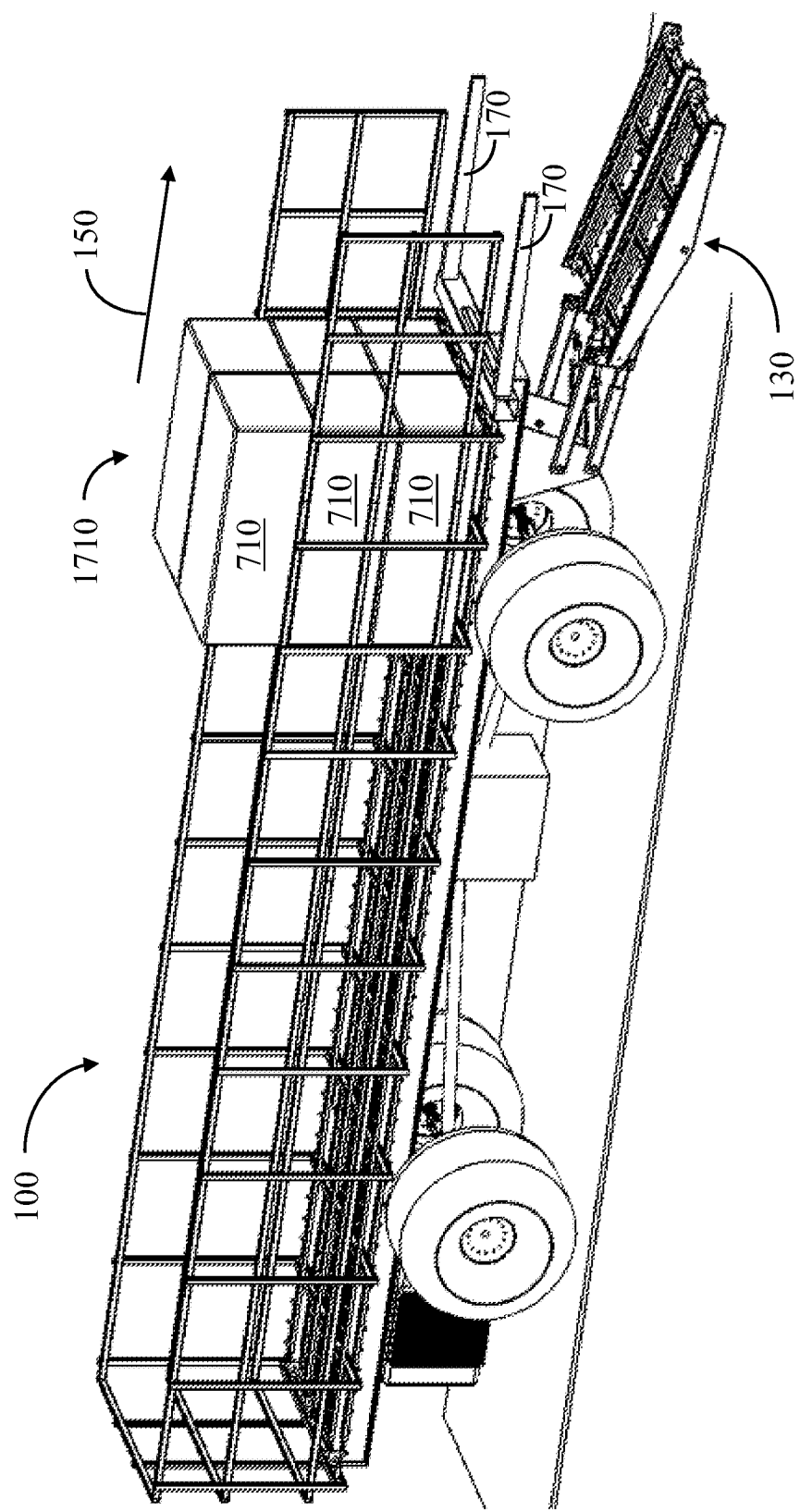
FIG. 19 is a thirteenth view in the sequence of views illustrating how stacks are made to compose a load.
Figure 20:
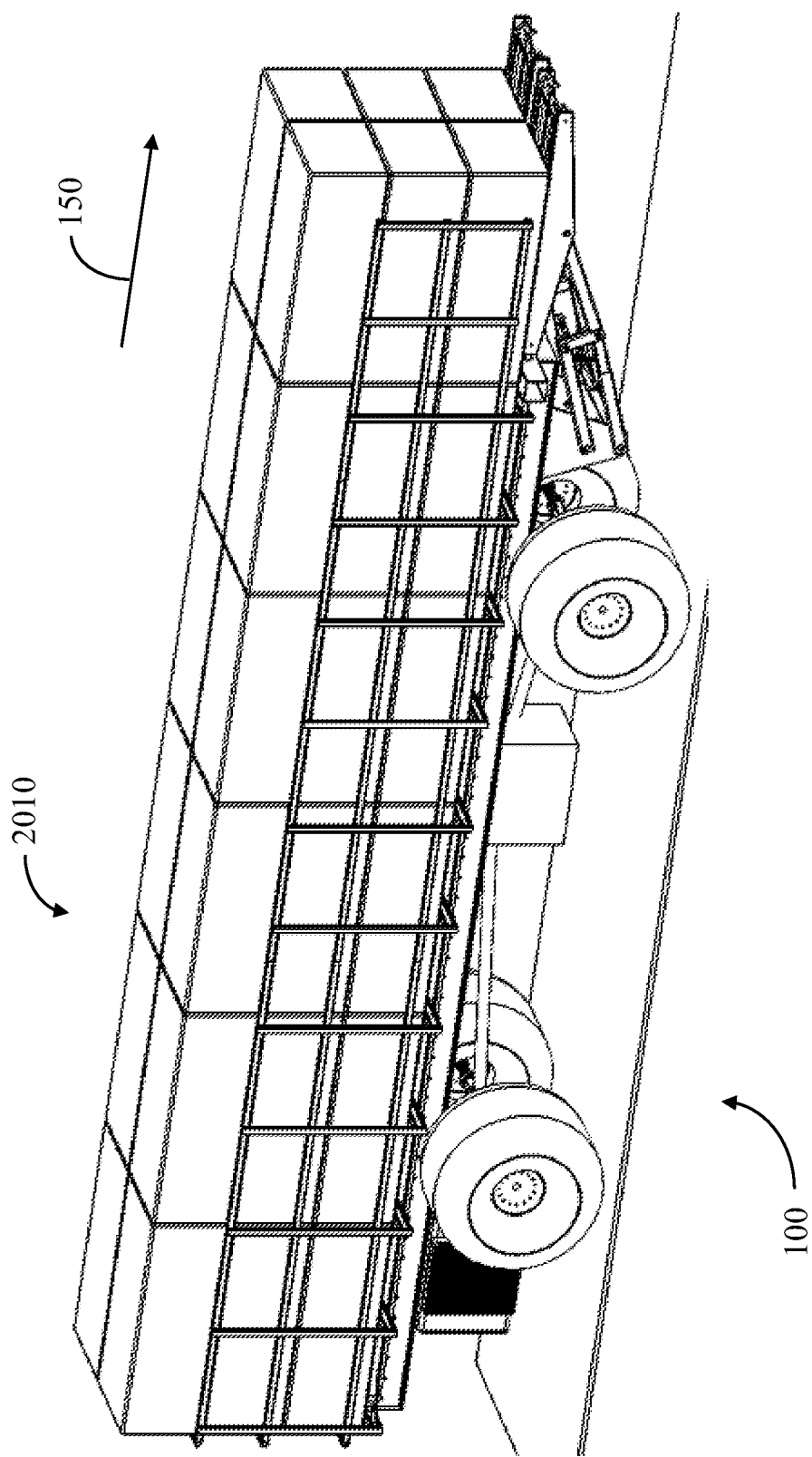
FIG. 20 is a fourteenth view in the sequence of views illustrating how stacks are made to compose a load.

The first stack 1710 is shifted rearward in the bale picking truck 100 the length of one bale 710 as shown in FIG. 18. At this point, the pickup assembly 130 is lowered to the ground to gather another pair of bales 710, and another stack 1710 assembled near the front of the bale picking wagon 100. Stacks 1710 are made sequentially and shifted rearward in the bale picking wagon 100 until the bale picking wagon 100 is full. When the bale picking wagon 100 is full, the plurality of stacks 1710 composes a load 2010 as shown in FIG. 20.

After the bale picking wagon 100 contains a load 2010, the bale picking truck 100 with its contents is driven to a staging area where the bales 710 of biomass material are unloaded in stacks 1710 as shown in the sequence of views in FIGS. 21-26. The bale picking truck 100 is again shown without its cab in these drawings for clarity.

Figure 21:
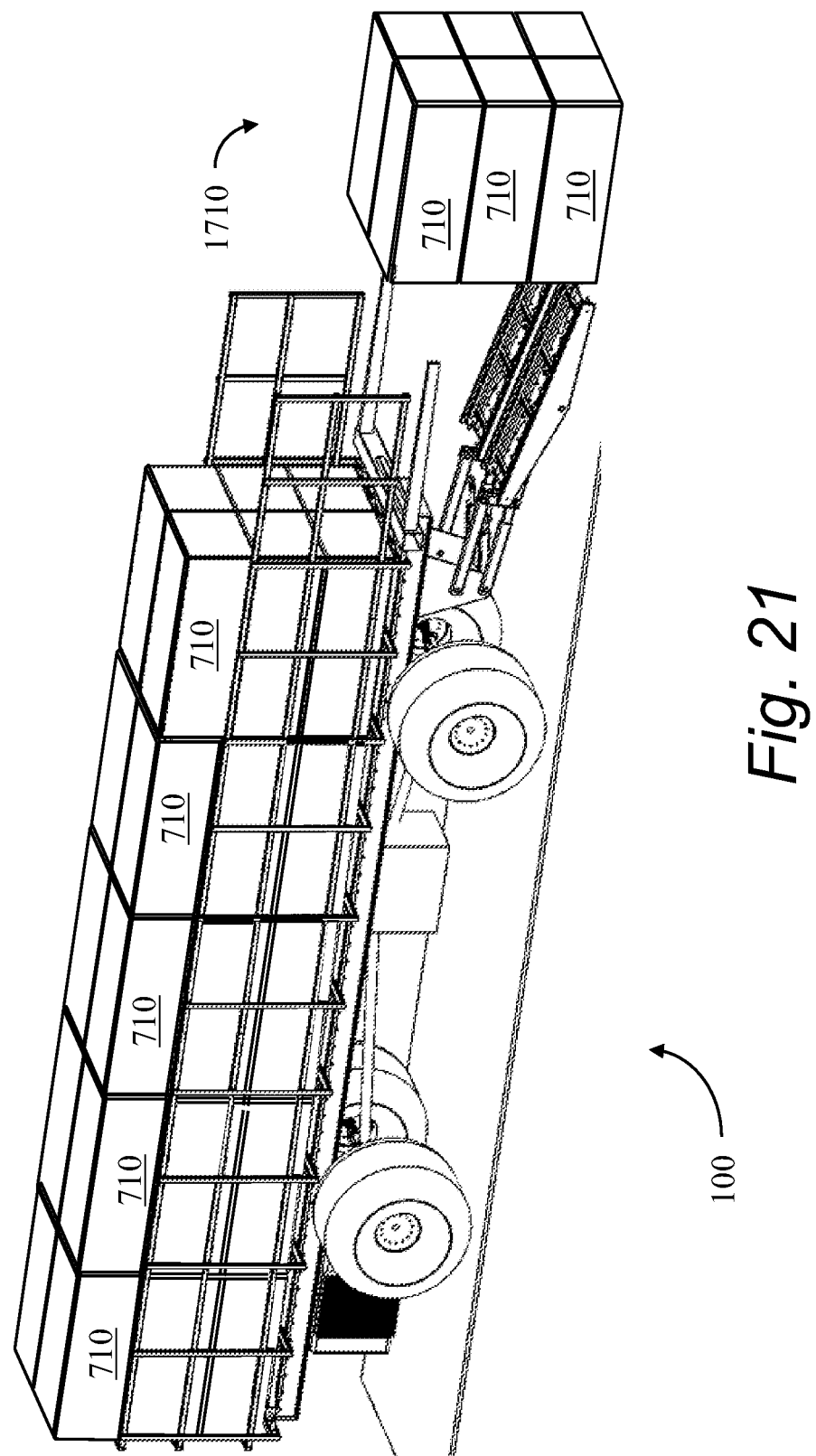
FIG. 21 is a first view in a sequence of views illustrating unloading stacks from the bale picking truck.

In FIG. 21, the front-most stack 1710, that is, the last stack 1710 to be loaded in the field, is lowered on the pickup assembly 130, the gathering chains 410 are reversed compared to the loading operation of FIGS. 7-20, and the bale stack 1710 is conveyed to the ground. The operator may need to reverse the bale picking truck 100 to clear the stack 1710 from the pickup assembly 130.

Figure 22:
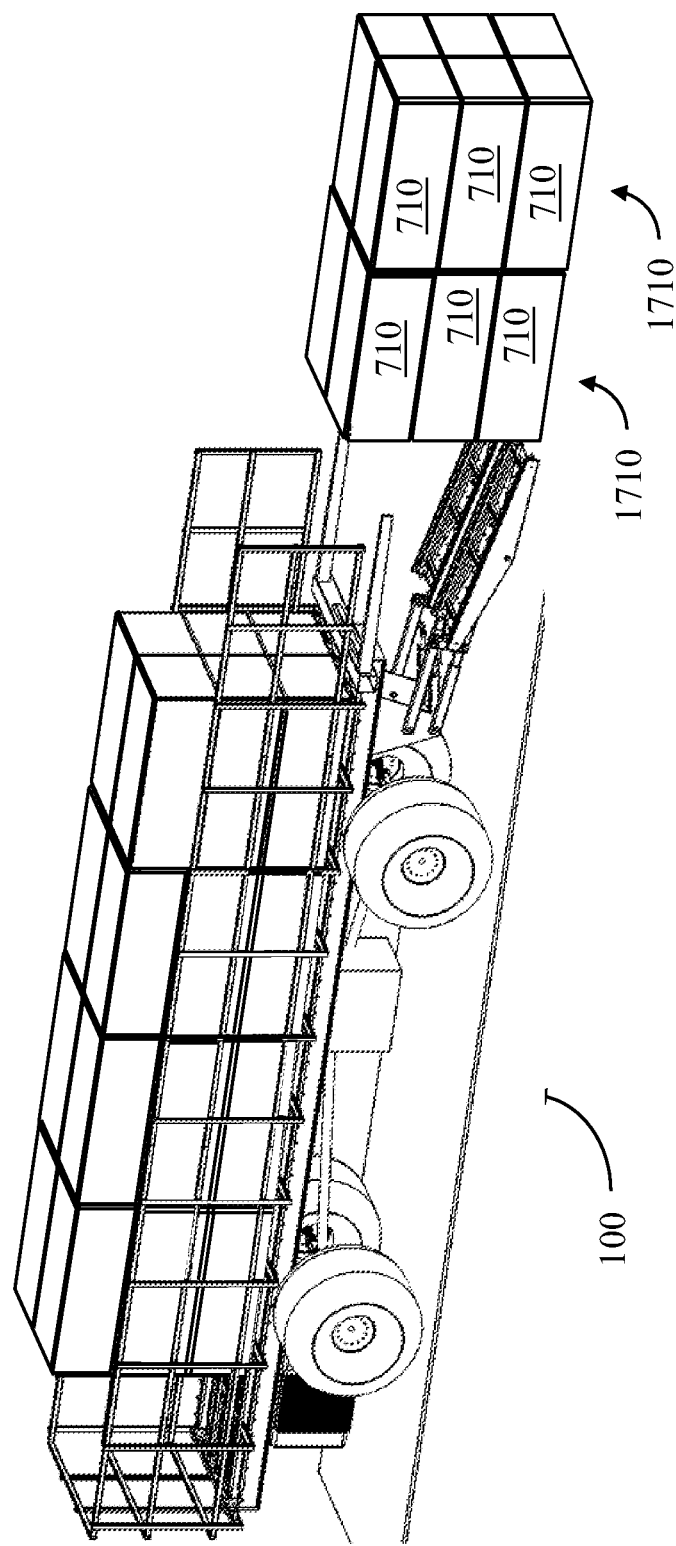
FIG. 22 is a second view in the sequence of views illustrating unloading stacks from the bale picking truck.

After the first stack 1710 has been unloaded, the remaining stacks 1710 are conveyed using the conveyor chains 160 toward the front of the bale picking truck 100. The second stack 1710 is now the front-most stack, and is lowered in the same fashion as the first stack 1710 as shown in FIG. 22.

Figure 25:
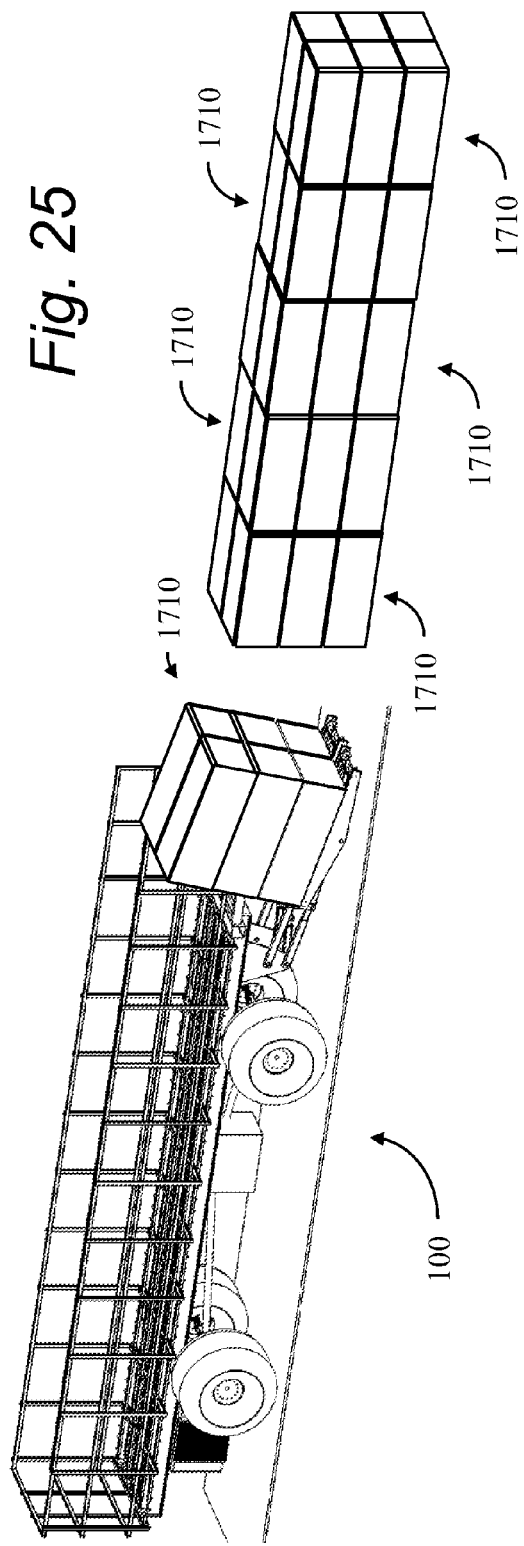
FIG. 25 is a fifth view in the sequence of views illustrating unloading stacks from the bale picking truck.
Figure 26:
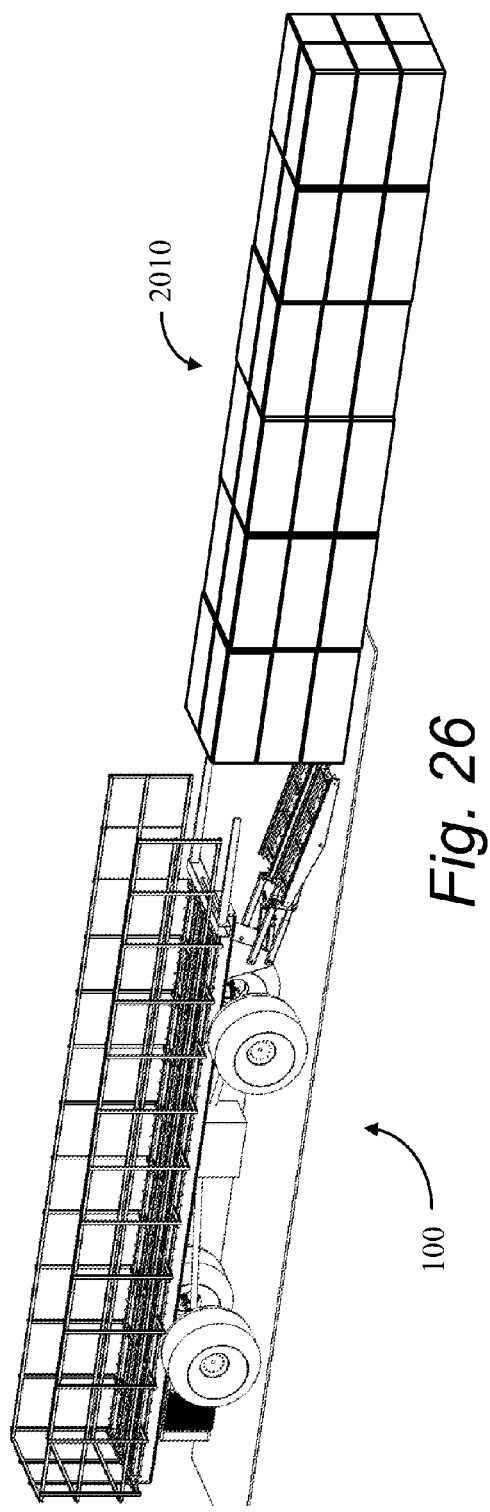
FIG. 26 is a sixth view in the sequence of views illustrating unloading stacks from the bale picking truck.

The unloading process continues as described above until all the stacks 1710 have been removed from the bale picking truck 100. More details of the unloading process are illustrated in FIGS. 24-26 associated with the last stack 1710. In FIG. 24, the bale stack 1710 is ready to begin its descent on the pickup assembly 130. In FIG. 25, the pickup assembly 130 has been articulated all the way to the ground surface, but the bale stack 1710 remains on the pickup assembly 130. In FIG. 26, the bale stack 1710 has been slid off the pickup assembly 130 using the gathering chains 410, and the stack 1710 deposited adjacent to another stack 1710. From the staging area, the load 2010 is preferably picked up by a semi tractor and trailer for transport to its final destination.

The use of the bale picking truck 100 described herein is not limited to bales of biomass for fuel. Bales to be used for livestock feed and bales to be used for erosion control are examples of uses to which the bale picking truck may be applied. The present invention is not limited to bales of a particular size or use.

It should be noted that many modifications and variations of the present invention are possible in light of the above teachings. It is, therefore, to be understood that within the scope of the appended claims, the invention may be practiced otherwise than as specifically described.

I claim:

1. A method for loading a plurality of bales from a ground surface on which the plurality of bales is disposed onto a bale picking truck, said bale picking truck comprising a pickup assembly operatively, pivotally attached to the bale picking truck, said pickup assembly comprising a plurality of members, the method comprising:
    (a) disposing the pickup assembly on a front of the bale picking truck;
    (b) approaching at least one of the plurality of bales with the pickup assembly;
    (c) pivoting the pickup assembly to dispose said pickup assembly near the ground and adjacent the at least one bale;
    (d) engaging the at least one bale with at least one of the plurality of members;
    (e) drawing the at least one bale onto the pickup assembly with the at least one of the plurality of members;
    (f) raising the pickup assembly up with respect to the bale picking truck;
    (g) lifting the at least one bale up to a level higher than the ground surface;
    (h) capturing the at least one bale with the gripper bars; and
    (i) holding the at least one bale at a predetermined level independently of a position of the pickup assembly.

2. The apparatus of claim 1 wherein the members are chains.

3. The method of claim 1 wherein the at least one bale comprises a first at least one bale, the method additionally comprising:
    (a) approaching a second at least one of the plurality of bales with the pickup assembly;
    (b) pivoting the pickup assembly to dispose said pickup assembly near the ground, beneath the first at least one bale captured by the gripper bars, and adjacent the second at least one bale;
    (c) engaging the second at least one bale with at least one of the plurality of members; and
    (d) drawing the second at least one bale onto the pickup assembly with the at least one of the plurality of members.

4. The method of claim 3 additionally comprising:
    (a) pivoting the pickup assembly up with respect to the bale picking truck;
    (b) lifting the second at least one bale directly under the first at least one bale;
    (c) operatively supporting the first at least one bale with the second at least one bale;
    (d) releasing the first at least one bale from the gripper bars;
    (e) raising the second at least one bale to the predetermined level higher than the ground;
    (f) capturing the second at least one bale with the gripper bars; and
    (g) holding the second at least one bale at the predetermined level independently of the position of the pickup assembly.

5. The method of claim 4 additionally comprising:
    (a) constructing a bale stack comprising a predetermined number of bales disposed vertically relative to one another;
    (b) engaging the bale stack with conveyor members; and
    (c) conveying said bale stack onto the bale picking truck with the conveyor members.

6. The method of claim 1 wherein the plurality of members comprises at least two sets of members, each set of members comprising at least one member, wherein each set of members is independently driven.

7. The method of claim 6 the independently driven sets of members are driven by independent hydraulic motors.

8. The method of claim 1 wherein the pickup assembly comprises at least one sensor, the method comprising:
   (a) sensing when the at least one bale has been drawn to a predetermined point on the pickup assembly;
   (b) generating a signal to indicate the at least one bale has reached the predetermined point on the pickup assembly;
   (c) halting the drawing of the at least one bale on the pickup assembly based on the signal.

9. The method of claim 5 additionally comprising:
   (a) conveying the bale stack from the bale picking truck to the pickup assembly using the conveyor members;
   (b) disposing the bale stack on the pickup assembly;
   (c) lowering the bale stack on the pickup assembly; and
   (d) conveying the bale stack off the pickup assembly to a surface not on the bale picking truck using the at least one of the plurality of members.

10. An apparatus for picking up bales in a field wherein said bales were baled, the apparatus comprising:
    (a) ground engaging wheels;
    (b) an engine;
    (c) a pickup assembly disposed at a front of the apparatus;
    (d) at least one member on the pickup assembly;
    (e) a pickup assembly lift for articulating the pickup assembly relative to a remainder of the bale picking truck;
    (f) at least one gripper bar to capture at least one bale at a location higher than the pickup assembly; and
    (g) wherein the gripper bar comprises includes two gripper bars; where the pickup assembly pivots upward to lift a first bale to a position whereby the gripper bars can grip the first bale; wherein the pickup assembly pivots upward to lift another bale into a position below the first bale, thereby raising the first bale until the second bale can be gripped by the gripper bars forming a stack.

11. The apparatus of claim 10 additionally comprising at least one hydraulic motor by which to drive the at least one member.

12. The apparatus of claim 10 wherein the at least one member comprises a plurality of members wherein the apparatus additionally comprises independent drives whereby at least two of the plurality of members are independently driven.

13. The apparatus of claim 10 additionally comprising at least one conveyor member by which to convey the bale onto the bale picking truck from the pickup assembly.

14. The apparatus of claim 10 additionally comprising at least one sensor disposed near a top of the pickup assembly to sense when the at least one bale has been drawn to a predetermined point on the pickup assembly.

15. The apparatus of claim 10 additionally comprising:
    (a) a sensor disposed near a top of the pickup assembly that will generate a first signal when the at least one bale has been drawn to a predetermined point on the pickup assembly; and
    (b) a control system to receive said signal and, consequently, to generate a second signal to stop the at least one bale's ascension onto the pickup assembly.

16. The apparatus of claim 9 wherein the member is a chain.

* * * * *